US 9,286,726 B2

(12) United States Patent
Balram et al.

(10) Patent No.: US 9,286,726 B2
(45) Date of Patent: *Mar. 15, 2016

(54) MOBILE INFORMATION GATEWAY FOR SERVICE PROVIDER COOPERATION

(71) Applicant: Ricoh Company, Ltd., Tokyo (JP)

(72) Inventors: Nikhil Balram, Mountain View, CA (US); Kathrin Berkner, Los Altos, CA (US); Ivana Tosic, San Francisco, CA (US); Wanmin Wu, Redwood City, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/137,529

(22) Filed: Dec. 20, 2013

(65) Prior Publication Data

US 2015/0059002 A1    Feb. 26, 2015

Related U.S. Application Data

(60) Provisional application No. 61/867,987, filed on Aug. 20, 2013.

(51) Int. Cl.
*G06F 7/04* (2006.01)
*G06T 19/00* (2011.01)
(Continued)

(52) U.S. Cl.
CPC .............. *G06T 19/006* (2013.01); *G06F 3/011* (2013.01); *G06F 21/31* (2013.01); *G06F 21/32* (2013.01);
(Continued)

(58) Field of Classification Search
CPC ....... G06T 19/006; G06T 21/31; G06T 21/32; H04W 4/003; H04W 4/00

USPC ........................................................ 726/28
See application file for complete search history.

(56) References Cited

U.S. PATENT DOCUMENTS 6,091,546 A    7/2000    Spitzer
6,166,656 A    12/2000   Okada et al.
(Continued)

FOREIGN PATENT DOCUMENTS

WO    2005066744 A1    7/2005
WO    2005094667 A2    10/2005

OTHER PUBLICATIONS

Bray, Alex, "Google Glass will Change your Branches," American Banker, http://www.americanbanker.com/bankthink/google-glass-will-change-your-branches-1057312-1 .html, pp. 1-2, retrieved on Dec. 31, 2014. Mar. 7, 2013.
(Continued)

*Primary Examiner* — Mohammad W Reza
(74) *Attorney, Agent, or Firm* — Patent Law Work LLP

(57) ABSTRACT

A mobile information gateway comprises a wearable human interface module having an image delivery and display mechanism for presenting information overlaid upon a wide field of view, a computing and communication module adapted receive information from the human interface module and adapted to send commands and information to the human interface module including information for presentation; and a backend service server coupled for processing data from the computing and communication module including user identification and verification. The present invention also includes a method for using the mobile information gateway for augmented use by employees interacting in the back office of a financial services company and comprises capturing information with a first human interface module; processing the information captured by the first human interface module; retrieving a set of shared information based upon the processing of the information captured by the first human interface module; presenting the shared set of information overlaid upon a field of view of the first user using the first human interface module; and presenting the shared set of information overlaid upon a field of view of the second user using a second human interface module.

18 Claims, 25 Drawing Sheets

(51) Int. Cl.

| | |
|---|---|
| *G06F 3/01* | (2006.01) |
| *G06F 21/32* | (2013.01) |
| *G06Q 20/00* | (2012.01) |
| *H04W 4/00* | (2009.01) |
| *G06F 21/31* | (2013.01) |

(52) U.S. Cl.
CPC ............... *G06Q 20/00* (2013.01); *H04W 4/00* (2013.01); *H04W 4/003* (2013.01); *G06F 2221/2149* (2013.01)

(56) References Cited

U.S. PATENT DOCUMENTS

| | | | |
|---|---|---|---|
| 6,349,001 | B1 | 2/2002 | Spitzer |
| 6,747,611 | B1 | 6/2004 | Budd et al. |
| 8,091,778 | B1 | 1/2012 | Block et al. |
| 8,212,859 | B2 | 7/2012 | Tang et al. |
| 8,438,110 | B2 | 5/2013 | Calman et al. |
| 8,582,850 | B2 | 11/2013 | Calman et al. |
| 2004/0205256 | A1* | 10/2004 | Hoffman et al. .............. 710/1 |
| 2006/0115130 | A1 | 6/2006 | Kozlay |
| 2008/0005702 | A1 | 1/2008 | Skourup et al. |
| 2008/0218588 | A1* | 9/2008 | Stetten ........................ 348/47 |
| 2008/0227429 | A1 | 9/2008 | Hodgson et al. |
| 2010/0121191 | A1 | 5/2010 | Ariff et al. |
| 2011/0153341 | A1 | 6/2011 | Diaz-Cortes |
| 2011/0239142 | A1* | 9/2011 | Steeves et al. ............. 715/764 |
| 2012/0200601 | A1 | 8/2012 | Osterhout et al. |
| 2012/0230557 | A1 | 9/2012 | Calman et al. |
| 2012/0233072 | A1* | 9/2012 | Calman et al. .............. 705/44 |
| 2012/0235785 | A1 | 9/2012 | Alberth et al. |
| 2013/0005443 | A1 | 1/2013 | Kosta et al. |
| 2013/0016070 | A1 | 1/2013 | Starner et al. |
| 2013/0038510 | A1 | 2/2013 | Brin et al. |
| 2013/0044042 | A1 | 2/2013 | Olsson et al. |
| 2013/0069850 | A1 | 3/2013 | Mukawa et al. |
| 2013/0070338 | A1 | 3/2013 | Gupta et al. |
| 2013/0162944 | A1 | 6/2013 | Fateh |
| 2013/0188080 | A1 | 7/2013 | Olsson et al. |
| 2013/0190096 | A1* | 7/2013 | Ronen et al. .................... 463/43 |
| 2013/0196457 | A1* | 8/2013 | Nakajima et al. ............. 438/14 |
| 2013/0196757 | A1 | 8/2013 | Latta et al. |
| 2013/0222369 | A1 | 8/2013 | Huston et al. |
| 2013/0317753 | A1 | 11/2013 | Kamen et al. |
| 2014/0005506 | A1 | 1/2014 | Elghazzawi |
| 2014/0145915 | A1 | 5/2014 | Ribble et al. |

OTHER PUBLICATIONS

European Search Report for Application No. 14179114.5, mailed on Nov. 6, 2014, 6 pages.

European Search Report for Application No. 14179432.1, mailed on Nov. 6, 2014, 5 pages.

European Search Report for Application No. 14179269.7, mailed on Nov. 6, 2014, 6 pages.

European Search Report for Application No. 14185144.4, mailed on Nov. 10, 2014, 5 pages.

Final Office Action for U.S. Appl. No. 14/161,609, dated Nov. 27, 2015, Nikhil Balram, 29 pages.

* cited by examiner

MOBILE INFORMATION GATEWAY FOR SERVICE PROVIDER COOPERATION

CROSS-REFERENCE TO RELATED APPLICATION

The present application claims priority, under 35 U.S.C. §119, to U.S. Provisional Patent Application Ser. No. 61/867,987, filed Aug. 20, 2013 and entitled "Mobile Information Gateway and Methods for Use," the entirety of which is hereby incorporated herein by reference.

BACKGROUND OF THE INVENTION

1. Field of the Art

The present specification generally relates to the field of mobile computing and associated devices. More particularly, the present specification relates to a mobile information gateway and methods for using the mobile information gateway that enable the user to continually access and use relevant information needed at any time and place. Still more particularly, the present specification relates to a mobile information gateway for service provider cooperation.

2. Description of the Related Art

In recent years, the computing capabilities as well as the functionality offered by mobile computing devices such as tablets, smart phones, and laptops have increased dramatically. The processing power provided by many present-day smart phones now exceeds the processing power that was available to desktop computers only a few years ago. However, because of their small size and form factor, inputting data and presenting information to the user have and continue to be a challenge for smart phones. Even for tablet computers, it is difficult to input information and tablets have limited display real estate to present information.

For a number of reasons, mobile computing devices have limited physical screen size that is not sufficient to provide a rich and complete experience that fully replaces what is available in a physical location. First, the existing mobile computing devices provide too narrow a field of view to see all types of information or to share information with others satisfactorily. Second, mobile computing devices do not have the capability to display information for a true 3-D experience. Third, existing mobile computing devices do not provide interfaces to input all types of material and manipulate all types of object satisfactorily.

SUMMARY OF THE INVENTION

The present invention overcomes the deficiencies and limitations of the prior art, at least in part, with a mobile information gateway. In one embodiment, the mobile information gateway comprises: a wearable human interface module (HIM) having an image delivery and display mechanism for presenting information with a wide field of view and in three dimensions, an audio input device, an audio output device, a camera, and an interface unit coupled for communication; a computing and communication module (CCM) coupled for communication with the wearable human interface module, the computing and communication module adapted to receive information from the human interface module and adapted to send commands and information to the interface module including information for presentation by the image deliver and display mechanism, the computing and communication module also adapted to communicate via a conventional network; and one or more backend service servers coupled for communication with the computing and communication module via the conventional network, the backend service server for processing data from the computing and communication module including user identification and verification.

In yet another embodiment, the method for using the mobile information gateway for augmented use by employees interacting in the back office of a financial services company and comprises capturing information with a first human interface module; processing the information captured by the first human interface module; retrieving a set of shared information based upon the processing of the information captured by the first human interface module; presenting the shared set of information overlaid upon a field of view of the first user using the first human interface module; and presenting the shared set of information overlaid upon a field of view of the second user using a second human interface module.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the inventive subject matter.

BRIEF DESCRIPTION OF THE DRAWINGS

The specification is illustrated by way of example, and not by way of limitation in the figures of the accompanying drawings in which like reference numerals are used to refer to similar elements.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The present invention will now be described in the context of a particular use case of banking where the system is used by tellers, bank managers, service representatives and other employees or contractors of a bank. It should be understood that the descriptors used herein are merely convenient labels to describe the use and operation of the system, that any person could use the human interface module 102 or other components of the system 100, and that they could be grouped together in a variety of groups other than by branch, bank or company. The present invention is useful to any number of users independent of their title or primary job responsibility. The advantages of the system are achieved by cooperation of its components and use by groups to cooperate and interact with each other as shown in the figures and described in the examples below.

System Overview

Figure 1A:
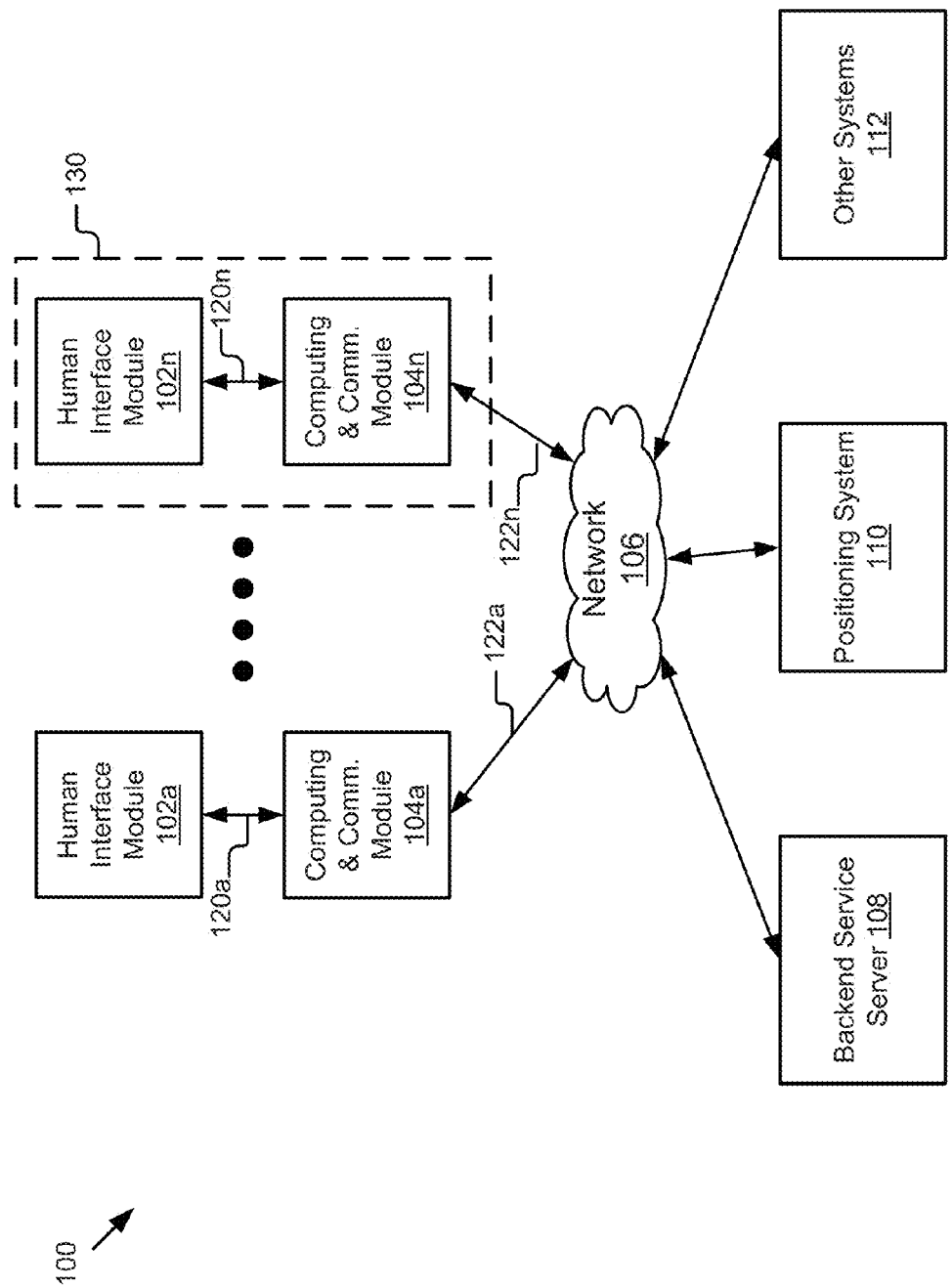
FIG. 1A is a high-level block diagram of one embodiment of a mobile information gateway.

FIG. 1A illustrates a high-level block diagram of a mobile information gateway 100 according to the present invention. In one embodiment, the illustrated description of the mobile information gateway 100 includes: a plurality of human interface modules 102a-102n (also referred to herein individually and collectively as 102), a plurality of computing and communication modules 104a-104n (also referred to herein individually and collectively as 104), a network 106, a backend service server 108, a positioning system 110 and other systems 112. The human interface module 102a is coupled for communication with a corresponding computing and communication module 104a by signal line 120a. In some embodiments, signal line 120a provides power as well as command and data signals. In some embodiments, signal line 120a may be a wired or wireless communication mechanism between a respective human interface module 102a and a computing and communication module 104a. Similarly, the human interface module 102n is coupled for communication with the corresponding computing and communication module 104 and by signal line 120n. The human interface module 102 and the computing and communication module 104 are preferably portable and used together by a single user. Each of the computing and communication modules 104a-104n is coupled for communication to the network 106 via signal lines 122a-122n, respectively. Signal lines 122a-122n represent wireless communication channels between the computing and communication modules 104 and the network 106. The network 106 is also coupled for communication with the backend service server 108, the positioning system 110 and other systems 112. Thus, the computing and communication modules 104 are able to communicate via the network 106 with any of the backend service server 108, the positioning system 110 or other systems 112. In some embodiments and in this application, the human interface module 102 and the computing and communication module 104 are collectively referred to as a mobile information gateway device 130.

The human interface module 102 is a wearable computing device including an image delivery and display mechanism, an audio delivery and speaker system, and image and audio capture capability. The human interface module 102 preferably includes an image delivery and display mechanism that is capable of providing a wide field of view to present large images or images in three dimensions. The image delivery and display mechanism seamlessly overlays a digital visualization (such as graphics, texts, images, and videos) over the real world, e.g., placing a virtual 3D chart on a physical table top. The audio delivery and speaker system includes an audio output device that provides mono or stereo sound to the user. The human interface module 102 also includes the ability to capture images, sound and various other information using different sensors. For example, the human interface module 102 processes images and recognizes gestures as one method for manipulating data presented by the human interface module 102. For another example, the human interface module 102 may capture real world scenes and deliver them to the computing and communication module 104 in real time which processes the images to generate 3D depth map of the scene and/or perform object recognition. In some embodiments, the human interface module 102 includes a portable light source. The human interface module 102 will be described in more detail below with reference to FIGS. 2 and 3.

The computing and communication module 104 provides computational support for the human interface module 102. The computing and communication module 104 is coupled by signal line 120 to the human interface module 102. In some embodiments, the signal line 120 is a combination of optical relay fibers and electronic wires for providing display data, commands and power and for receiving data and commands. The computing and communication module 104 provides general graphics and multimedia processing for any type of application. The computing and communication module 104 may operate using the conventional operating system such as android, Windows or iOS. The computing and communication module 104 also has high-bandwidth communication capabilities and is coupled for communication with the network 106. The computing and communication module 104 is described in more detail below with reference to FIGS. 2 and 3.

The network 106 may be a conventional type, wired or wireless, and may have any number of configurations, for example, a star configuration, token ring configuration or other configurations. Furthermore, the network 106 may include a local area network (LAN), a wide area network (WAN) (e.g., the Internet), and/or any other interconnected data path across which multiple devices may communicate. In some implementations, the network 106 may be a peer-to-peer network. The network 106 may also be coupled to or include portions of a telecommunications network for sending data in a variety of different communication protocols. In some implementations, the network 106 includes Bluetooth communication networks, Wi-Fi networks, or a cellular communications network for sending and receiving data, e.g., via short messaging service (SMS), multimedia messaging service (MMS), hypertext transfer protocol (HTTP), direct data connection, WAP, email, etc.

The backend service server 108 is a system or server coupled to the network 106 capable of providing a service. The backend service server 108 may be either a hardware server or a software server. The backend service server 108 may be entirely hardware, entirely software or a combination of hardware and software. The backend service server 108 may include a processor, memory, applications, a database and other information. Although only a single backend service server 108 is shown in FIG. 1A, it should be understood that there may be any number of backend service servers 108 or a server cluster. In some embodiments, different servers offer different services. For example, different service components in the backend service servers 108 may provide services related to a particular business vertical such as banking, retail sales, transportation, food service, hotel and housing, etc. Similarly different service components in the backend service servers 108 may provide different types of computing functions such as image processing, scene analysis, facial recognition, iris detection and authentication, voice recognition, encryption, translation, format conversion, etc. In some embodiments, the backend services server 108 also includes a service recommendation engine implemented as software or routines having the functionality described below. The backend service server 108 is coupled for communication with one or more of the computing and communication modules 104 via the network 106.

The mobile information gateway may optionally include the positioning system 110. The positioning system 110 may be a series of sensors, a grid or array of sensors, or beacons for detecting the location and orientation of the human interface module 102 and/or the computing and communication module 104. For example, the positioning system 110 may also use data from the human interface module 102 and/or the computing and communications module 104 to determine their location and orientation. For example, various indoor systems may be used to get precise location and orientation information for smaller environments where the human interface module and the computing and communications module 104 will be used. The positioning system 110 may use GPS, Wi-Fi positioning, cellular positioning, MEMS sensors, Bluetooth beacons, indoor messaging systems, near field communications, RFID, and ultrasonic beacons, camera networks, etc. Moreover, in some embodiments, customers or users are given a beacon such as a wireless transmitter as they entered the branch of a bank. In other embodiments, the user's smart phone may be used to generate a beacon to locate the customer in the bank branch. This wireless transmitter can emit a fixed code which can be used to identify specific customers. The mobile information gateway 100 uses the signal from the wireless transmitter to determine the precise location within the branch of the customer. This location information can then be provided to a teller wearing a mobile information gateway device 130 so that the teller can locate the person they are supposed to service within the branch.

The other systems 112 in FIG. 1A represent other existing systems. The human interface module 102 and the computing and communications module 104 are capable of interfacing and interacting with other systems 112. The human interface module 102 and the computing and communications module 104 can send information and commands to the other systems 112 or receive information from the other systems 112. In some embodiments, the other systems 112 may include motion sensors, wall displays, coffee makers, projection systems for lighting control, temperature sensors, ambient light sensors, body health monitoring sensors, pollution sensors, radiation sensors, HVAC systems etc.

Figure 1B:
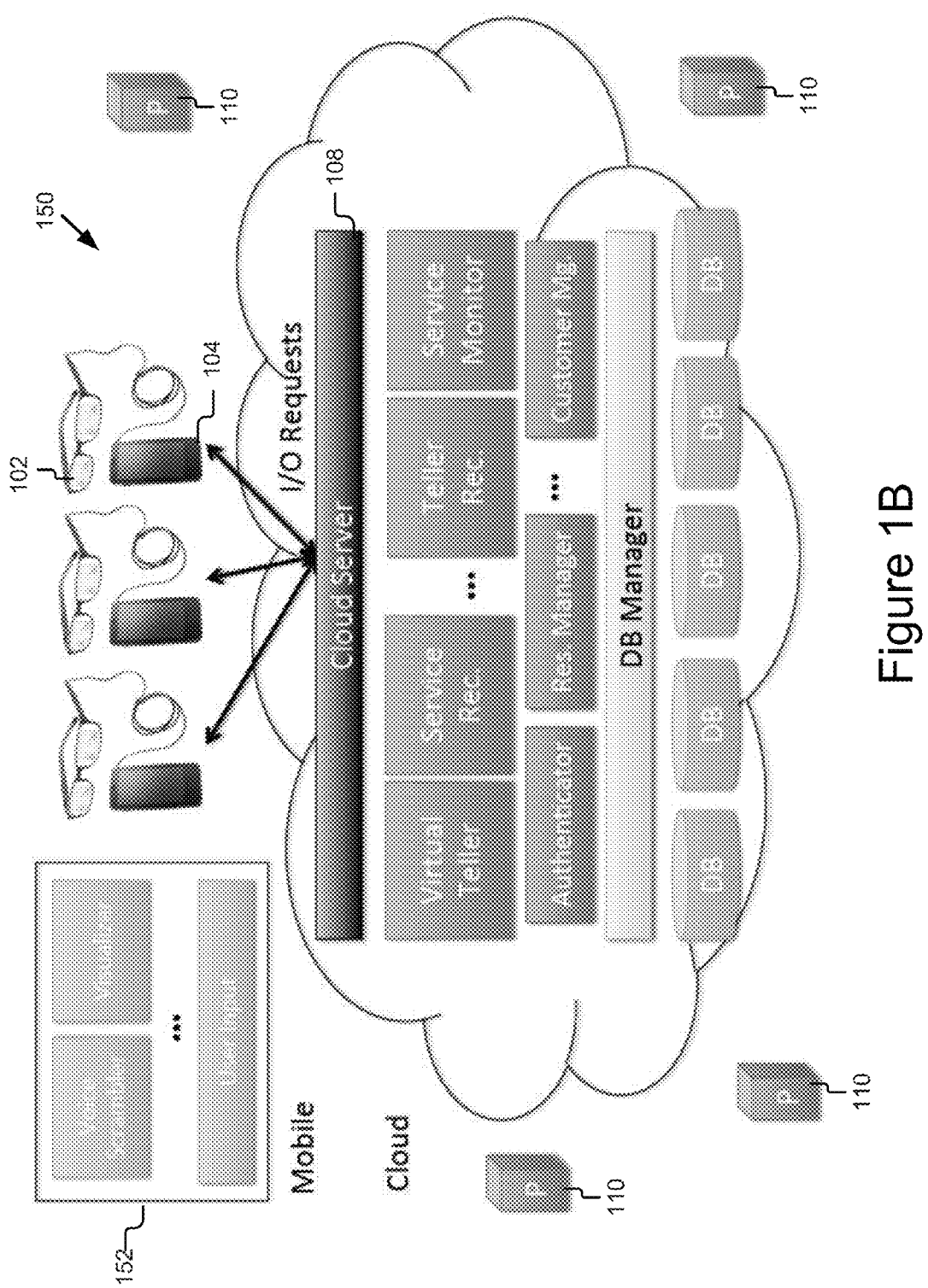
FIG. 1B is a high-level block diagram of a second embodiment of the mobile information gateway.

FIG. 1B is a high-level block diagram of a second embodiment of the mobile information gateway 150. The second embodiment of the mobile information gateway 150 provides a specific embodiment in which the human interface module 102, the computing and communications module 104 and the backend service server 108 are used to enhance the delivery of banking services. In this example, there are again a plurality of pairs of human interface modules 102 and computing and communications modules 104 (e.g., a plurality of mobile information gateway devices 130). Each human interface module 102 is coupled to a corresponding computing and communications module 104. The mobile information gateway 150 also includes the position system 110 with sensors positioned at different locations. In this embodiment, the computing and communications modules 104 communicate with the backend services server 108 that is located in the cloud. The human interface module 102 is adapted to receive user input such as gestures, to present the images via a visualizer and to scramble or encrypt the voices of the users. These functions are represented by box 152 and are operational in the human interface module 102 and/or the computing and communications module 104. In another scenario, the electronic audio signal between the two people talking is encrypted. For example, if a first user, Alice, and a second user, Bob, want to have a private conversation, they could each put on a mobile information gateway device 130a, 130b. The human interface module 102 of each mobile information gateway device 130 will have both audio input (microphone) and output (speaker and an earphone) components. When Alice talks/whispers, for example, her voice is picked up by her own microphone on mobile information gateway device 130a, and transmitted to Bob's earphones on his mobile information gateway device 130b via networks. Now suppose another person Chuck stands near them. To avoid Chuck hearing Alice's words, Alice's mobile information gateway device 130a could output some scrambling audio signals through its speaker as soon as its microphone detects Alice speaking. The scrambling signals could be designed in such a way that the mix of Alice's normal voice and the scrabbling signals is incomprehensible (and this is what Chuck hears). Alice's and Bob's earphones could have some noise-canceling capability such that the scrambling signals don't affect them.

In some embodiments, the human interface module 102 and the computing and communications modules 104 are utilized by customers of a bank. In the same or other embodiments, the human interface module 102 and the computing and communications modules 104 are utilized by employees of a bank.

The backend service server 108 in this embodiment is specifically adapted to provide various functions that are part of providing banking services. For example, the backend service server 108 includes a virtual teller, a service recommendation module, a teller recommendation module and a service monitor module. The virtual teller module interfaces with the human interface module 102 and the computing and communications module 104 to present a virtual teller when the customer uses these devices. The service recommendation module is utilized by a bank employee using the human interface module 102 and the computing and communications module 104. Based on images and other information captured by the human interface module 102 and sent to the service recommendation module, a suggested recommendation for a type of service or product will be presented on the display of the human interface module 102 so that the bank representative may offer it to the customer. The teller recommendation module may be accessed by either the employee or the customer, and information about the customer is sent to the teller recommendation module so that the customer may be identified and authenticated, and then a teller may be recommended to the customer. The recommended teller may be based on a variety of factors including which tellers are busy or have the longest wait times, teller skills for specialized services needed by the customer, personality matches between the teller and the customer, ethnographical/language specific matching between teller and customer, historical interactions (positive or negative) between the customer and the teller, expertise of the teller or bank employee, etc. Service monitor module is a module for capturing information from any one or all of the human interface modules 102 to monitor and ensure that services are delivered according to the banks guidelines. These modules in turn may call upon an authenticator module, a reservation manager module or a customer manager module as well as access data available from a database manager in a variety of databases. The databases store information about customers, financial instruments, services, security, transactions, etc. The authentication module is used to authenticate the customer, to authenticate the bank employee, and to authenticate that both are authorized to perform a particular action. Reservation manager manages the delivery of services by the bank employees and can make recommendations as to who to service next as well as what services to provide.

Figure 1C:
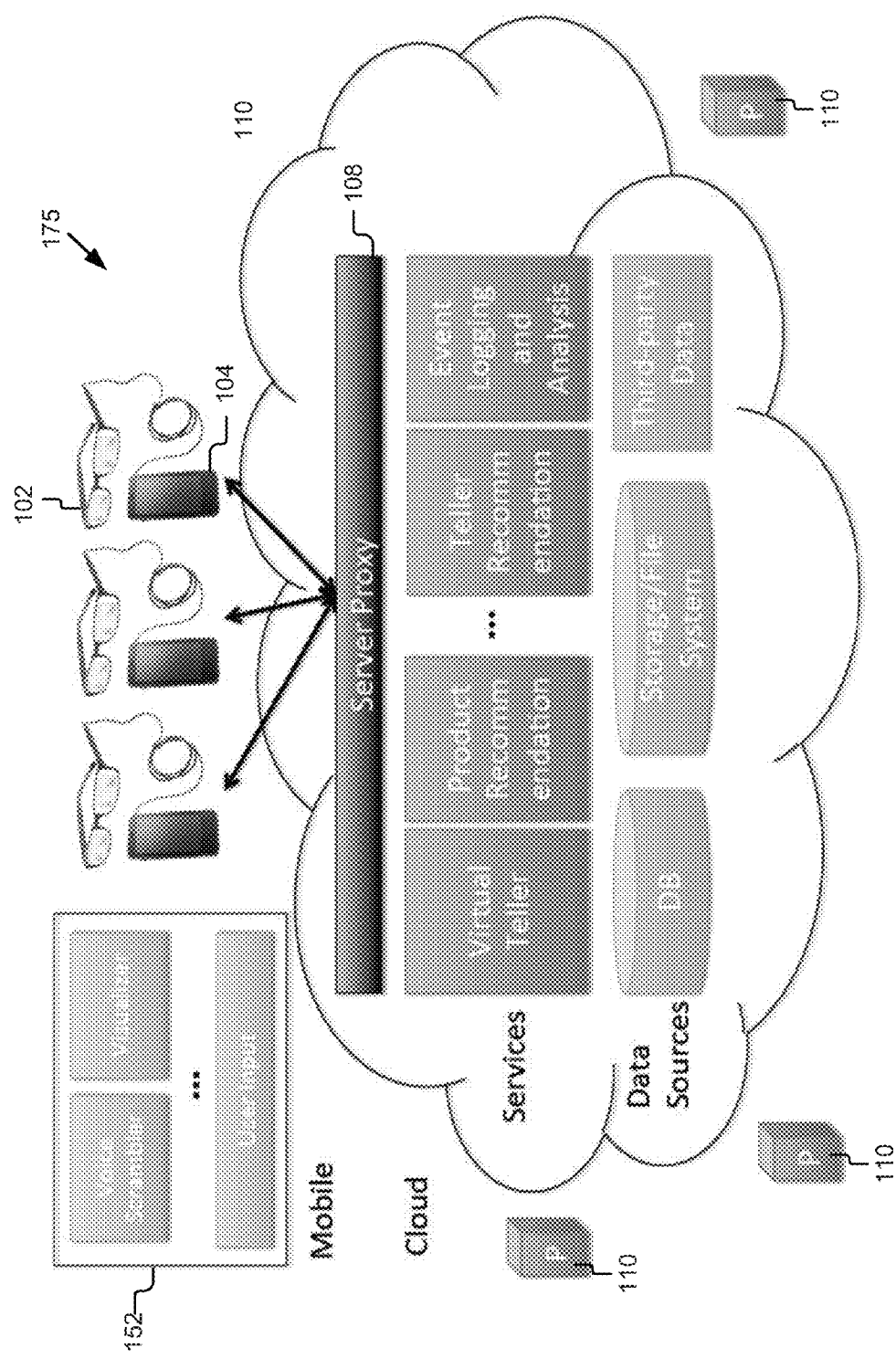
FIG. 1C is a high-level block diagram of a third embodiment of the mobile information gateway.

FIG. 1C is a high-level block diagram of a third embodiment of the mobile information gateway 175. In this third embodiment of the mobile information gateway 175, like numerals have been used to reference like components with the same or similar functionality as has been described above for the second embodiment of the mobile information gateway 150. Where the components have similar functionality, that description will not be repeated here. However, the third embodiment of the mobile information gateway 175 differs in some notable respects. First, the backend service server 108 includes three general layers: (1) Server Proxy which interacts with the computing and communications module 104 to receive and send requests and data, (2) Services which include a number of service components such as virtual teller, product recommendation, and teller recommendation. (3) Data Sources which may include databases, storage/file system, and third party data. In some embodiments, these layers are in software level and operate on a cluster of computers or servers. These computers form a distributed network to provide backend services to the computing and communications module 104 via a common interface.

Figure 2:
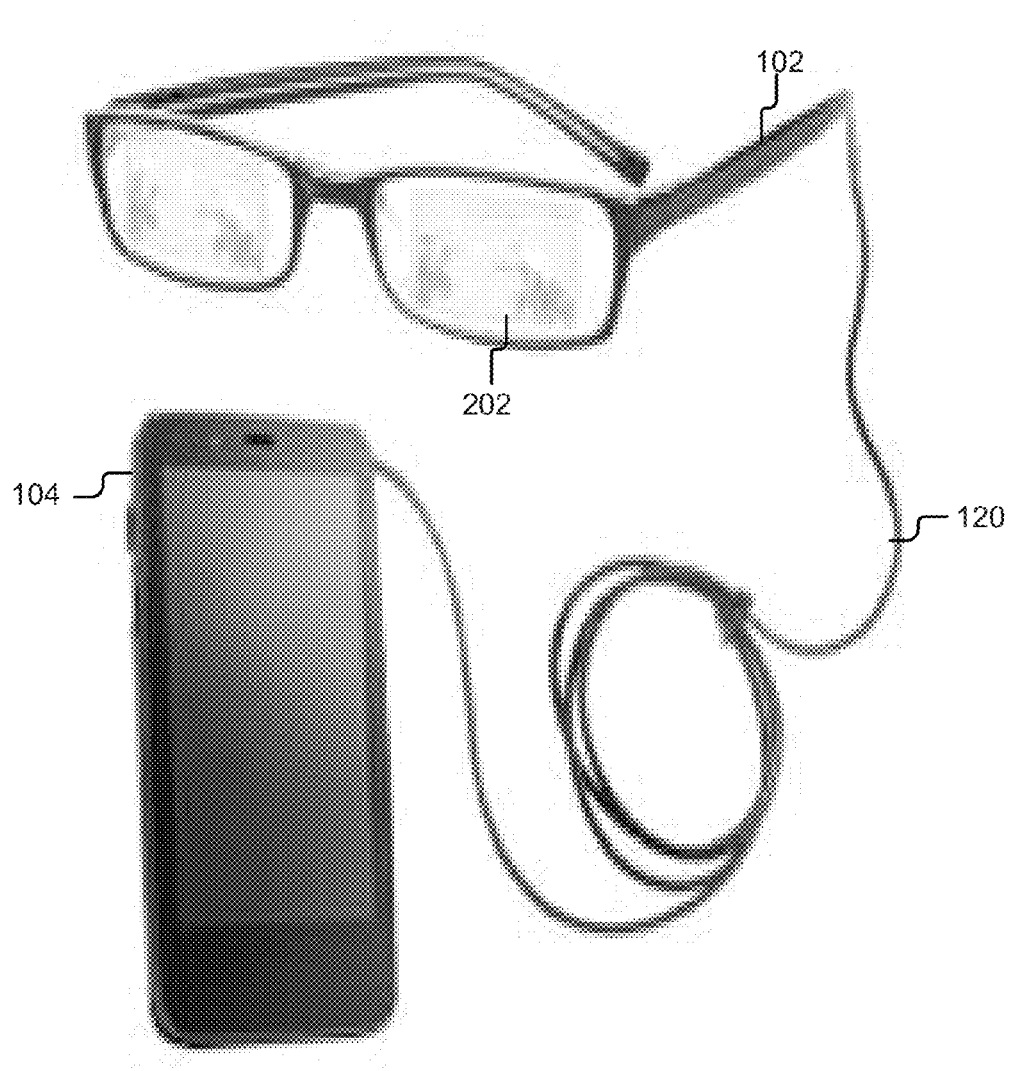
FIG. 2 is a perspective view of one embodiment of a wearable human interface module coupled to a computing and communication module.

FIG. 2 is a perspective view of one embodiment of a wearable human interface module 102 coupled to a computing and communication module 104 by signal line 120. In this embodiment, the wearable human interface module 102 has the form of eyeglasses. For example, the image delivery and display mechanism 302 may include a substrate 202 (e.g., a lens) and a projection system (not shown—See description of 302 below) for projecting information onto the substrate 202. In some embodiments, the substrate 202 is transparent or an optically transmissive substrate. Thus, when the user views an area through the substrate 202, it appears as if the projected information is overlaid over the wide field of view provided when viewing the area through eyeglasses. The wearable human interface module 102 preferably has a form, structure and weight similar to conventional eyeglasses; however, with the enhanced image delivery and display capabilities and the image, audio and environmental sensing capabilities that will be described in more detail below with reference to FIG. 3. It should be understood that FIG. 2 shows only one embodiment of the wearable human interface module 102. In other embodiments, the wearable human interface module 102 may take the form of a bracelet, a watch, a headset, etc. The signal line 120 in this embodiment includes optical relay fibers and electronic wires. The optical relay fibers provide display information to the wearable human interface module 102 from the computing and communications module 104. The electronic wires provide electronic signals and power between the human interface module 102 and the computing and communications module 104. In this embodiment, the computing and communications module 104 has the form and function similarly to a smart phone. For example, it includes a processor, memory with an operating system, the ability to communicate wirelessly using both voice and data channels, a camera, a microphone, and various other sensors. In this embodiment, the computing and communications module 104 also has a form factor similar to that of a smart phone. However, it should be understood that the computing and communications module 104 may have other form factors similar to that of a bracelet, a pendant, watch, cell phone, or other wearable computing forms.

Figure 3:
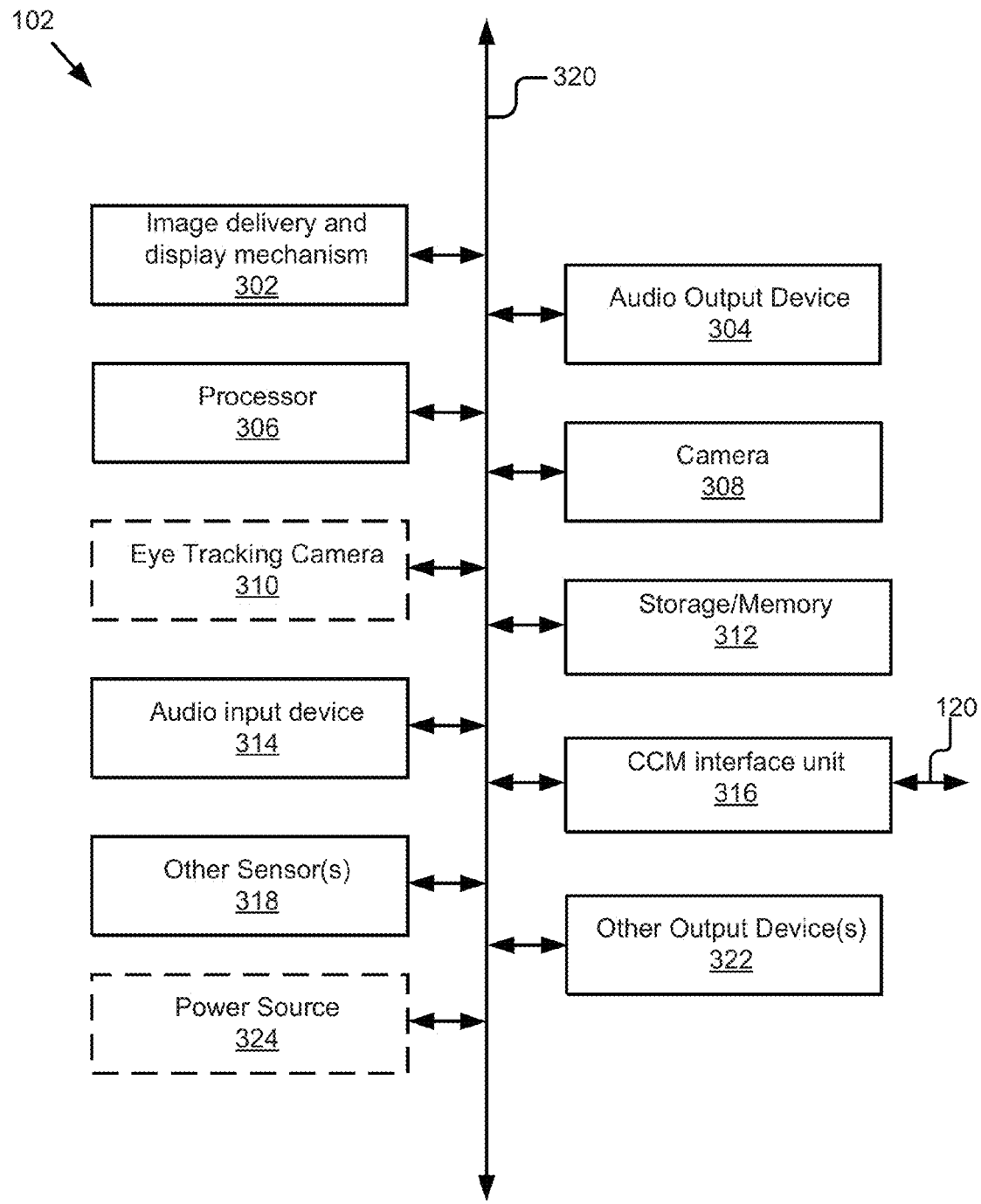
FIG. 3 is a block diagram of one embodiment of a human interface module.

FIG. 3 is a block diagram of one embodiment of the human interface module 102. In this embodiment, the human interface module 102 comprises: an image delivery and display mechanism 302, and audio output device 304, a processor 306, a camera 308, an eye tracking camera 310, storage or memory 312, and audio input device 314, a CCM interface unit 316, other sensors 318, other output devices 322 and a power source 324. These components of the human interface module 102 are communicatively coupled to a bus or software communication mechanism 320 for communication with each other.

The image delivery and display mechanism 302 is a system for providing a wide field of view to present large images, a binocular see-through (transparent) display, or display images in three dimensions. In one embodiment, the image delivery and display mechanism 302 includes a projection mechanism to display images in a virtual plane. In another embodiment, the image delivery and display mechanism 302 includes a projection system for in-eye projection of images. Example embodiments for the image delivery and display system 302 are shown and described below with reference to FIGS. 5-8B. In yet another embodiment, the images are projected onto the lenses of the glasses forming the human interface module 102. In still another embodiment, the image delivery and display mechanism 302 projects the image on the wall, desktop, tabletop or nearby surface. The image delivery and display mechanism 302 may include laser diodes, scanning fiber display, scanned light display, 3-D displays (stereoscopic, automultiscopic or volumetric), light field, substrate-guided optics, light-guided optical elements, etc. The image delivery and display mechanism 302 is coupled to receive image data for display. In one embodiment, the image delivery and display mechanism 302 receives optical signals directly from the CCM interface 316. In another embodiment, the image delivery and display mechanism 302 is coupled to the bus 320 and cooperates with the processor 306 and the CCM interface unit 316 to produce images for presentation. In some embodiments, the image delivery and display mechanism 302 includes adaptive optics to correct for the visual ability of the user so that the human interface module 102 can be used by anyone irrespective of whether they require prescription glasses. In yet another embodiment, the image delivery and display mechanism 302 cooperates with the other sensors 318 to detect the ambient light conditions and provide for control either automatically or under user control of per pixel opacity of display. It should be understood that other dimming mechanisms such as application of UV light or electrical signals to the glasses of the human interface module 102 may also be provided to make the display modulate the level of ambient light that enters the display.

The human interface module 102 is in general a wearable device that permits a scene adapted overlay of virtual information on the real world objects. Regardless of the specific embodiment, reference to the terms "overlays" or "overlaid" refers to scene adapted overlay. In the embodiment of the present invention, the image delivery and display mechanism 302 "overlays" information related to the first customer on a field of view or retrieved information is "overlaid" over a field of view. In other words, the user is able to see the real world that is not blocked by the overlay. In the preferred embodiment, the image delivery and display mechanism 302 is a see-through medium through which the real world can be seen by the eyes of the user and on which virtual objects can be displayed overlaid on top of or next to real objects. For example, this is overlay may be achieved with the image delivery and display mechanism 302 projecting information onto a transparent substrate so that the projected information can be viewed on the substrate while the real world may be seen through the transparent substrate. In a second embodiment, the image delivery and display mechanism 302 projects the information and the area behind it is made opaque occluding the real word behind it as much as possible, however, the portion of real world that is not blocked by the projected overlay can be seen by the user. Given the entire scene information, the image delivery and display mechanism 302 selects specific means of rendering, e.g. high luminance contrast, or color contrast, font style/size and type, etc., so the projected information is visible against a background of the real world. The overlaid virtual object can completely block the light reflected from the real object or can partially transmit light. In still another embodiment, the real world is capture with a camera and information is digitally overlaid over a video captured by the camera and presented to the user.

The audio output device 304 is coupled to the bus 320 to receive audio signals and generate sound. The audio output device 304 may include earphones, speakers, a bone conducted speaker or transducer, or an audio output jack for coupling to external speaker sources. The audio output device 304 generates sound and outputs it to the user of the human interface module 102. The audio output device 304 is responsive to signals from the processor 306 or the CCM interface unit 316. For example, the audio output device 304 may output scrambling audio signal that makes the voice of the customer incomprehensible to a third person other than the teller for privacy concerns.

The processor 306 may include an arithmetic logic unit, a microprocessor, a general purpose controller or some other processor array to perform computations and other operations for the human interface module 102. The processor 306 is coupled to the bus 320 for communication with the other components. Processor 306 processes data signals and may include various computing architectures including a complex instruction set computer (CISC) architecture, a reduced instruction set computer (RISC) architecture, or an architecture implementing a combination of instruction sets. Although only a single processor is shown in FIG. 3, multiple processors may be included.

The camera 308 may be an image capture device. The camera 308 is preferably forward facing having a field of view similar to the user's perspective when wearing the human interface module 102 (e.g., glasses). The camera 308 may be an HD camera, a regular 2D video camera, a multi-spectral camera, a structured light 3D camera, a time-of-flight 3D camera, or a stereo camera, etc. The camera 308 is capable of capturing images and providing those images to the processor 306 and the storage memory 312 so that the human interface module 102 can sense and recognize gestures, recognize and authenticate customers, perform facial recognition, perform face/skin tone recognition, and interpret the real world scene. The camera 308 is coupled to the bus 320 to provide images and other processed metadata to the processor 306, the storage or memory 312 or the CCM interface unit 316.

The eye tracking camera 310 is similarly an image capture device. The eye tracking camera 310 is inward facing towards the face of the user of the human interface module 102. The eye tracking camera 310 has enough resolution to capture the eye movement, gaze direction, and iris detail of the user. The eye tracking camera 310 is coupled to the bus 320 to provide information to the processor 306, the storage or memory 312, or the CCM interface unit 316. The images captured by the eye tracking camera 310 can be used to determine eye gaze direction and movement for one or both eyes and translate it into control or other inputs to the human interface module 102. The images captured by the eye tracking camera 310 can also be used to identify and authenticate the user such as by sending the images to the backend service server 108 or the computing and communications module 104 for iris detection and recognition. In some embodiments, the eye tracking camera 310 is optional.

The storage or memory 312 stores instructions and/or data that may be executed by the processor 306. The memory 206 is coupled to the bus 320 for communication with the other components. The instructions and/or data may include code for performing any and/or all of the techniques described herein. The memory 312 may be a dynamic random access memory (DRAM) device, a static random access memory (SRAM) device, flash memory or some other memory devices. The memory 312 may store and operating system, applications and other software modules executable by the processor 306.

The audio input device 314 may be a microphone or similar device for capturing audio signals in the environment in which the human interface module 102 is used. The audio input device 314 may also be used for capturing voice and other sounds near the human interface module 102. The audio input device 314 is coupled by the bus 320 to provide these signals for additional processing by the processor 306 or for storage in the memory 312. For example, the audio input device 314 can be used to capture signals that can be used for voice recognition. The signals can be used for identification or authentication of the user or to input commands or data.

The CCM interface unit 316 is electronics and other hardware to facilitate communication between the human interface module 102 and the computing and communication module 104. The CCM interface 316 is coupled to the bus 320 for communication with the other components of the human interface module 102. The CCM interface 316 is also coupled to signal line 120 for communication with the computing and communication module 104. As will be described in more detail below, the CCM interface 316 may provide power, optical signals, and electrical signals between the human interface module 102 and the computing and communications module 104. In some embodiments, the CCM interface unit 316 may include other communication devices to allow the human interface module 102 to communicate with the computing and communications module 104 or other devices such as via Bluetooth, Wi-Fi or other standard communication protocols.

The human interface module 102 also includes one or more other sensors or input devices 318. For example, the other sensors 318 may include: a finger operated touch panel, motion sensors such as a 3-axis gyroscope, a 3-axis accelerometer, a 3-axis magnetometer, an ambient light sensor, a thermal sensor, environmental sensors (for pollution or radiation), proximity sensor, RF detector, a GPS sensor, a head tracker, brainwave sensor, buttons, intelligence self-powered sensors, credit card reader, biometric sensors such as pulse rate, breathing rate, perspiration and other sensors for lie detection type identification. The one or more other sensors or input devices 318 are coupled to the bus 320 to provide the signals to the processor 306.

The other output devices 322 may be coupled to bus 320 to provide additional feedback to the user. For example, other output devices 322 to provide haptic feedback may be included as part of the human interface module 102.

In some embodiments, another output device 322 is an illumination device such as an ultraviolet light source. The illumination device may be selectively activated in conjunction with a security system to authenticate the genuineness of currency, identification cards and other documents. It should be understood that an ultraviolet light source is merely one example of another output device 322. Other output devices 322 may include various other types of output devices used for counterfeit detection. The illumination device can be used in conjunction with the camera 308 such that the camera 308 captures an image of the currency, identification card or other document in view of the human interface module 102 while the illumination device is activated. The image captured by the camera 308 while the illumination device is activated can then be image processed by the security system to determine whether the document is genuine or counterfeit. For example, many currencies have a security thread or other markings that become more visible under ultraviolet light. In other embodiments, counterfeit detection does not require the illumination device, but rather image processing may be performed by the human interface module 102, the computing and communication module 104 or the backend service server 108 upon images of documents captured by the human interface module 102. This is similar to picture analysis performed by certain high-end photocopiers. If the document is counterfeit, a signal can be generated and sent to the human interface module 102, other human interface modules, or various other systems. In some embodiments, this process happens automatically without the wearer of the human interface module 102 knowing that a counterfeit has been detected. In other embodiments, the illumination device is selectively activated while the user of the human interface module 102 is inspecting the document, so that the security features in the document are immediately identifiable by the wearer of the human interface module 102. Depending on the embodiment, the security system that interacts and controls the illumination device may be part of the human interface module 102, the computing and communication module 104, or the backend service server 108. In one embodiment, the security system is software or routines operable on any one of these or a combination of these components 102, 104 and 108.

In still other embodiments, the output device 322 is night vision mechanism. The night vision mechanism may be an image intensification system that provides an enhanced image of the scene through the human interface module 102 to the user. Alternatively, the night vision system may include active illumination such as a near infrared or shortwave illumination and a lowlight camera. In yet another embodiment, the night vision mechanism may be a thermal imaging system to provide a thermal image of the scene to the user via the human interface module 102.

The output device may have a NIR illuminator used for iris recognition.

The power source 324 may be a battery. In some embodiments, the battery may be rechargeable or replaceable. As noted above, in some embodiments, the CCM interface unit 316 provides power to operate the human interface module 102. In such a case, the power source 324 is optional and thus FIG. 3 with dashed lines.

It should be understood that other processors, operating systems, sensors, displays and physical configurations are possible for the human interface module 102. For example, the human interface module 102 may also include a light source (not shown).

Figure 4A:
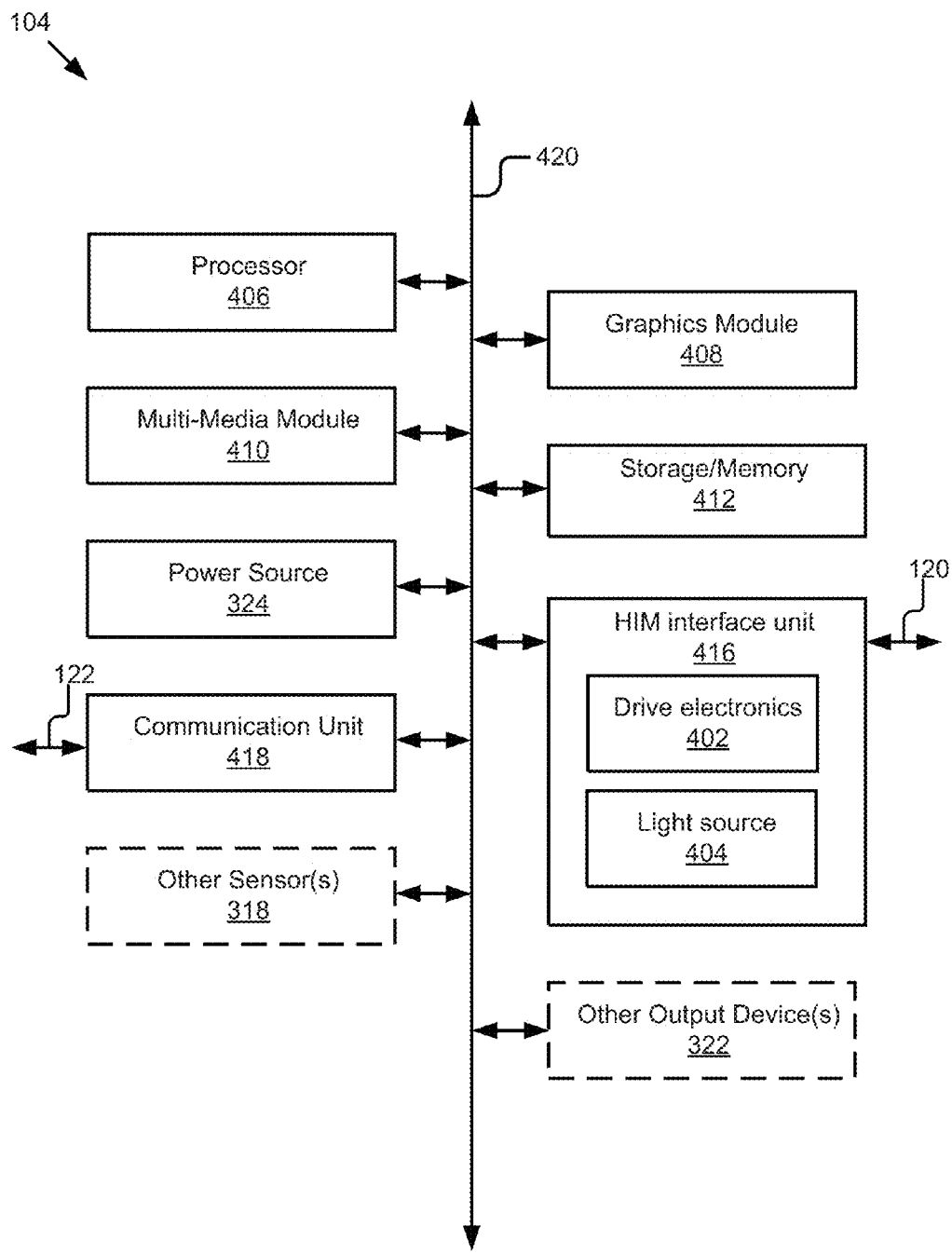
FIG. 4A is a block diagram of one embodiment of a computing and communication module.

FIG. 4 is a block diagram of one embodiment of a computing and communications module 104. In this embodiment, the computing and communications module 104 comprises: a processor 406, a graphics module 408, a multimedia module 410, storage or memory 412, a power source 324, HIM interface unit 416, a communications unit 418. The HIM interface unit 416 may include drive electronics 402 and a light source 404. These components of the computing and communications module 104 are communicatively coupled to a bus or software communication mechanism 420 for communication with each other. In some embodiments, the computing and communications module 104 may optionally include other sensors 318 and other output devices 322.

It should be understood that in general, the components of the computing and communications module 104 have greater performance and speed than the similar components of the human interface module 102. The human interface module 102 and the computing and communications module 104 are able to divide or partition processing responsibility such that the human interface module 102 is responsible primarily for creating interfaces and affordance that allow users to interact with existing information in new ways and thereby provide better and new services to the customer as well as new ways of interacting with information collectively. The computing and communications module 104 is primarily responsible for assisting the human interface module 102 with processing of information and facilitating faster communication with other resources. It should be understood that there may be a variety of other divisions of labor between the human interface module 102, the computing and communications module 104 and the backend service servers 108 other than those described herein. However, those other organizations are contemplated by the present disclosure and the specific division of labor can be adapted to the specific application or business context in which the mobile information gateway 100 is being used.

In some embodiments, the computing and communications module 104 may include a gesture interface to input controls, commands and data. Also, the computing and communications module 104 may serve as an "adapter" or interface to other devices and systems, such as probes, medical devices, bank teller equipment, light pen, pointer or any other specialized equipment for a particular business vertical. In some embodiments, the computing and communications module 104 may be responsible for rendering the visual information and the human interface module 102 may be responsible for only displaying the rendered data. In some embodiments, the computing and communications module 104 may decode, transcode, decompress or decrypt image, video or audio data before sending it to the human interface module 102.

In general, most computation should be performed on the computing and communications module 104. The human interface module 102 should perform a minimal amount of computation on its sensors and output devices. Its computation will mostly involve capturing images, audio signals, and/or other information, compressing them if necessary, and transmitting them to the computing and communications module 104 for further processing.

The processor 406 is similar to that described above with reference to FIG. 3, so that description will not be repeated here. However, the processor 406 may have greater processing capabilities and functionality.

The graphics module 408 is coupled to the bus 420 and cooperates with the processor 406 to generate graphic images that can be presented at the human interface module 102. The graphics module 408 in this embodiment is a hardware device and in alternate embodiments may be software storable in the memory 412, or a combination of hardware and software.

The multimedia module 410 is coupled to the bus 420 and cooperates with the processor 406 to produce multimedia for display at the human interface module 102. The multimedia module 410 in this embodiment is a hardware device that cooperates with the processor 406 to perform some of the computational task required in processing video. However, in other embodiments, the multimedia module may be software stored on the memory 412 executable by the processor to achieve the same functionality or maybe a combination of hardware and software. It should be understood that the processor 406, graphics module 408 and the multimedia module 410 may be integrated as a system-on-chip (SoC).

Figure 4B:
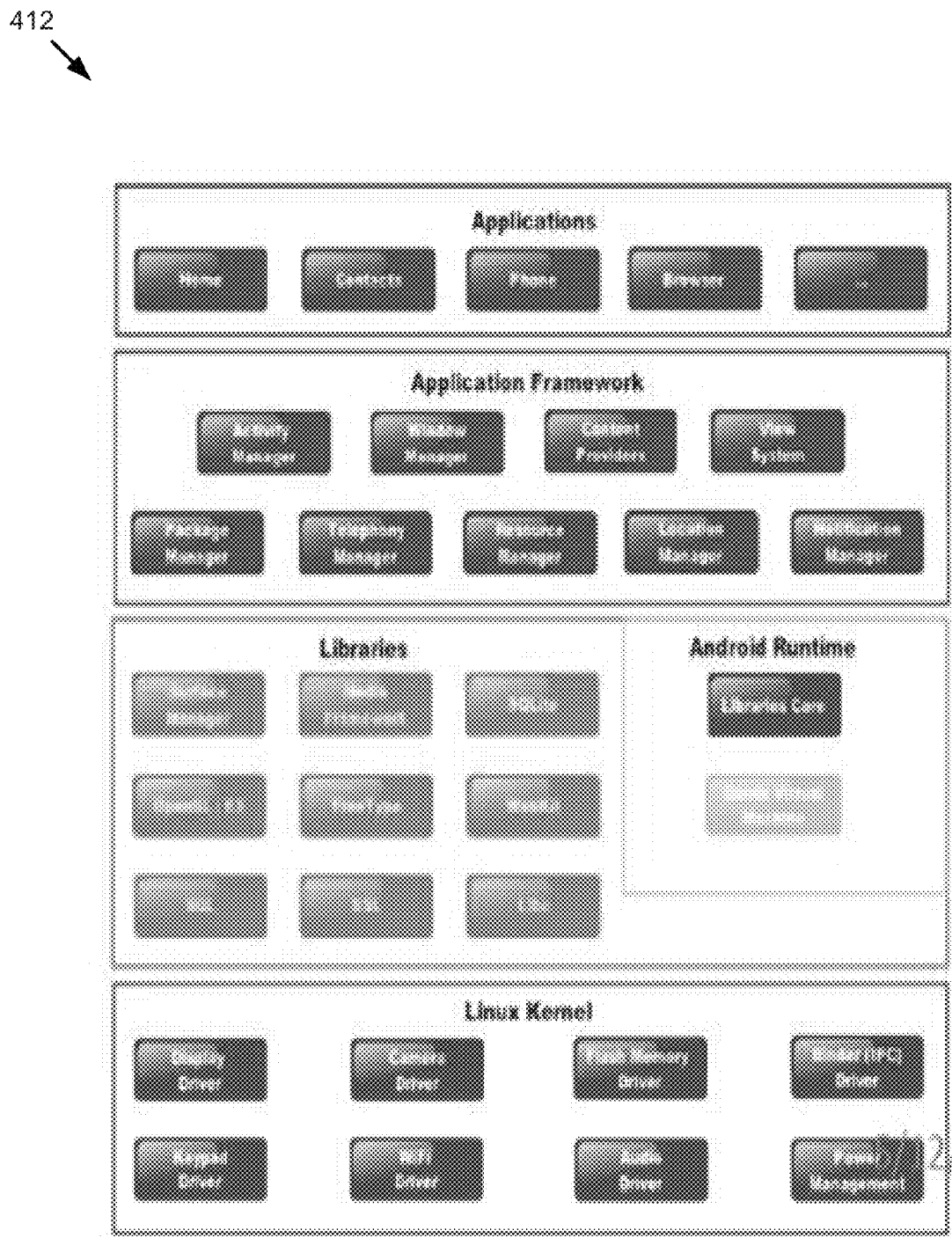
FIG. 4B is a block diagram of example software modules stored in the memory of the computing and communication module.

The storage or memory 412 is similar to that described above for the human interface module 102. However the memory 412 may also include storage since the form factor for the computing and communications module 104 provides more area. In addition to being flash memory, in some implementations, the storage or memory 412 may also include a non-volatile memory or similar permanent storage device and media, for example, a hard disk drive, or some other non-volatile storage device. The storage or memory 412 stores and operating system, applications, libraries and other information used by both the computing and communications module 104 and the human interface module 102. A diagram of example software modules (e.g., a high level operating system, specifically Android by Google Inc. of Mt View, Calif.) stored in the memory 412 is shown in FIG. 4B.

The power source 324 is preferably a battery or some other rechargeable power source capable of supplying required for the computing and communications module 104.

The HIM interface unit 416 is electronics and other hardware to facilitate communication between the computing and communication module 104 and the human interface module 102. The HIM interface unit 416 is coupled to the bus 420 for communication with the other components of the computing and communication module 104. The HIM interface unit 416 is also coupled to signal line 120 for communication with the human interface module 102. In some embodiments, the HIM interface unit 416 provides power, optical signals, and electrical signals from the computing and communication module 104 to the human interface module 102. The HIM interface unit 416 may include drive electronics 402 and the light source 404 to generate and send optical signals to the human interface module 102. The HIM interface unit 416 may also send data and commands to and receive from data and commands from the human interface module 102.

The computing and communication module 104 may include other sensors 318 and other output devices 322. These may be the same as described above for the human interface module 102 or maybe subsets of the sensors 318 and output devices 322 described above.

Figure 5:
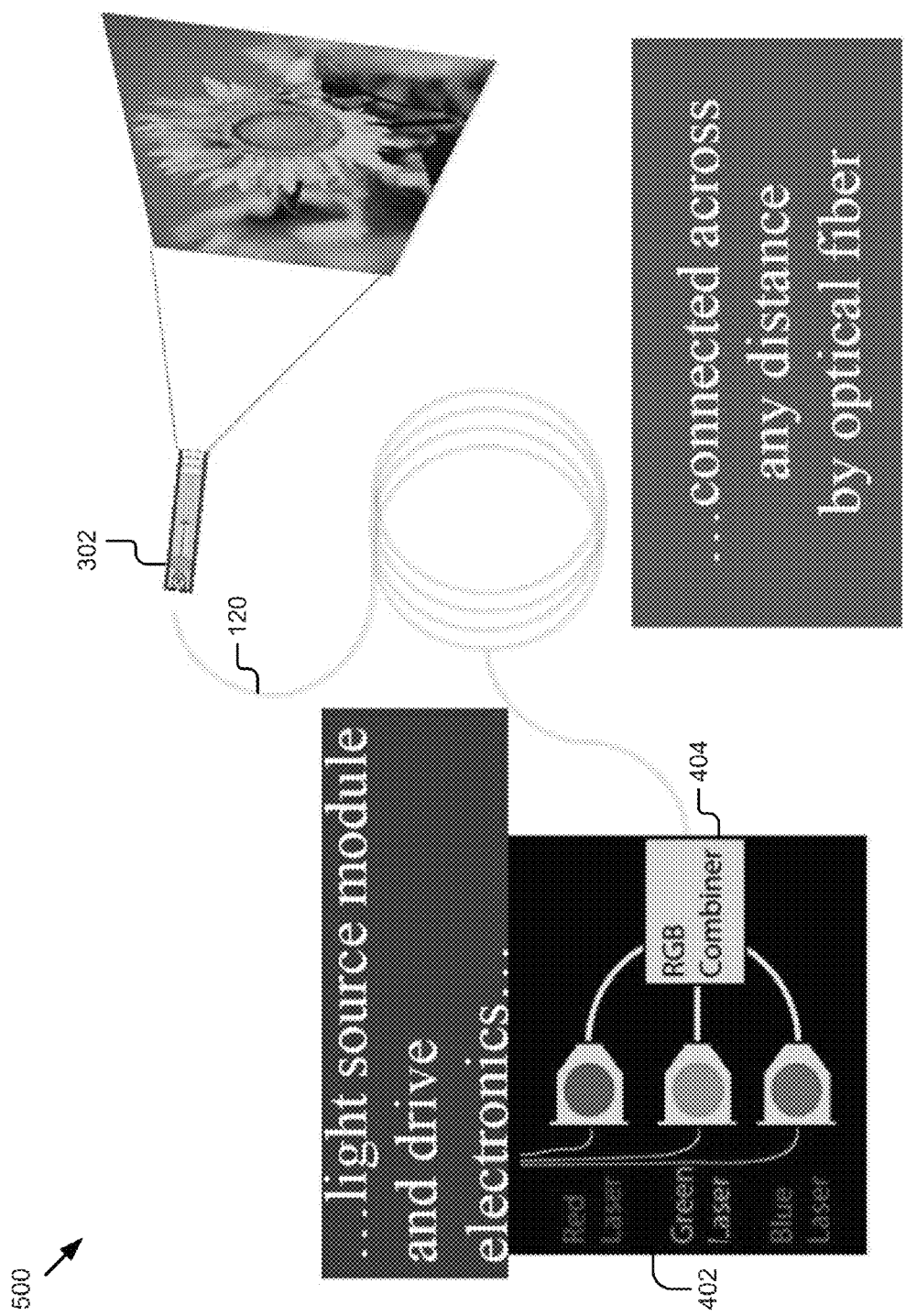
FIG. 5 is a diagram of one example for light source, drive electronics, coupling and image delivery and display mechanism.

Referring now to FIG. 5, one example for light source 402, drive electronics 404, signal line 120 and the image delivery and display mechanism 302 are shown. In this example, the light source 402 is a plurality of lasers, i.e., a red laser, a green laser, and a blue laser. The outputs of these lasers are provided to the drive electronics 404, which is an RGB combiner to generate images that are sent as light through signal line 120. In this case signal line 120 is an optical fiber that couples the RGB combiner 404 with the image delivery and display mechanism 302. The image delivery and display mechanism 302 then projects the images so that they are visible to the user of the human interface module 102.

Figure 6:
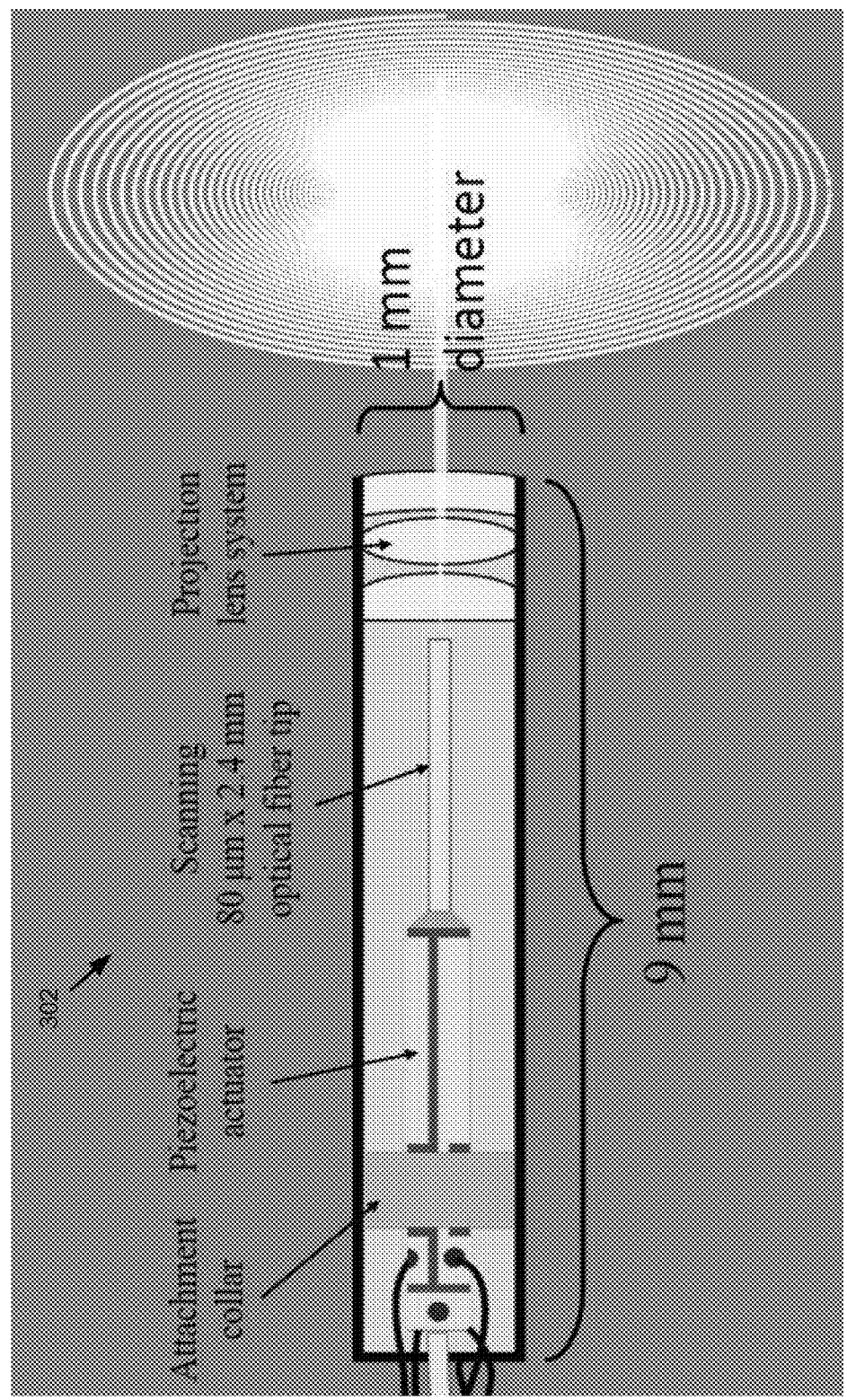
FIG. 6 is a diagram of one example of the image delivery and display mechanism.

Referring now to FIG. 6, one example of the image delivery and display mechanism 302 is shown. The image delivery and display mechanism 302 is coupled to the optical fiber 120 and includes a scanning fiber projection engine. The scanning fiber projection engine has a piezoelectric actuator coupled to an optical fiber tip directed to lens projection system to output the images received from the drive electronics onto a virtual plane. In particular, FIG. 6 illustrates how the image delivery and display mechanism 302 can be constructed at a very small scale (e.g. less than 9 mm) such that the image delivery and display mechanism 302 could be integrated into the glasses of FIG. 2.

Figure 7:
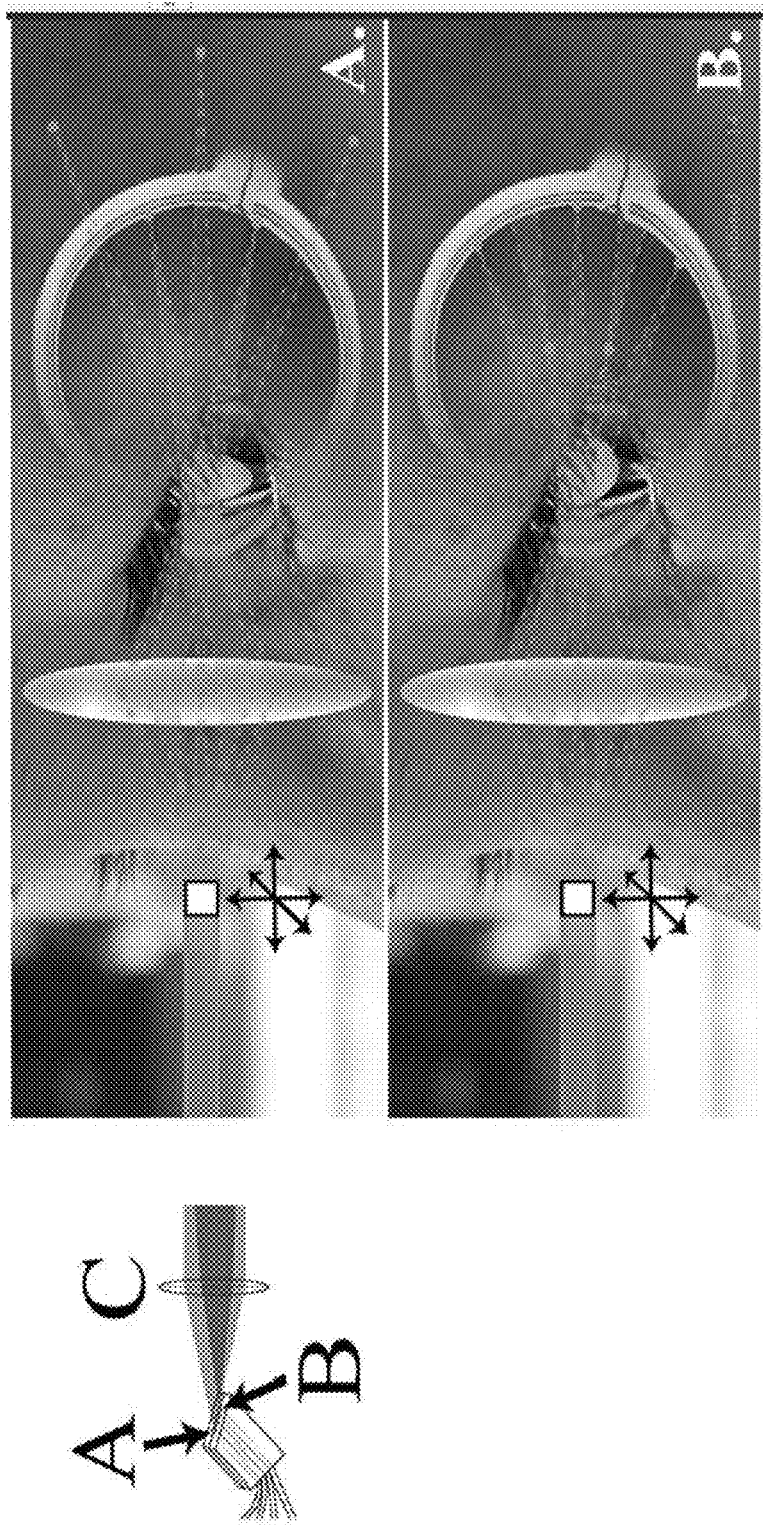
FIG. 7 is a diagram of one example of in eye projection of a 3-D display.

FIG. 7 shows one example of in eye projection of a volumetric 3-D display. FIG. 7 illustrates how the image delivery and display mechanism 302 could be configured in position on an eyeglass frame to project a volumetric 3-D display onto the retina of the user. In such an example, the image delivery and display mechanism 302 scans a fiber bundle with a mirror scanner and then use the lens system to project the image to the user.

Figure 8A:
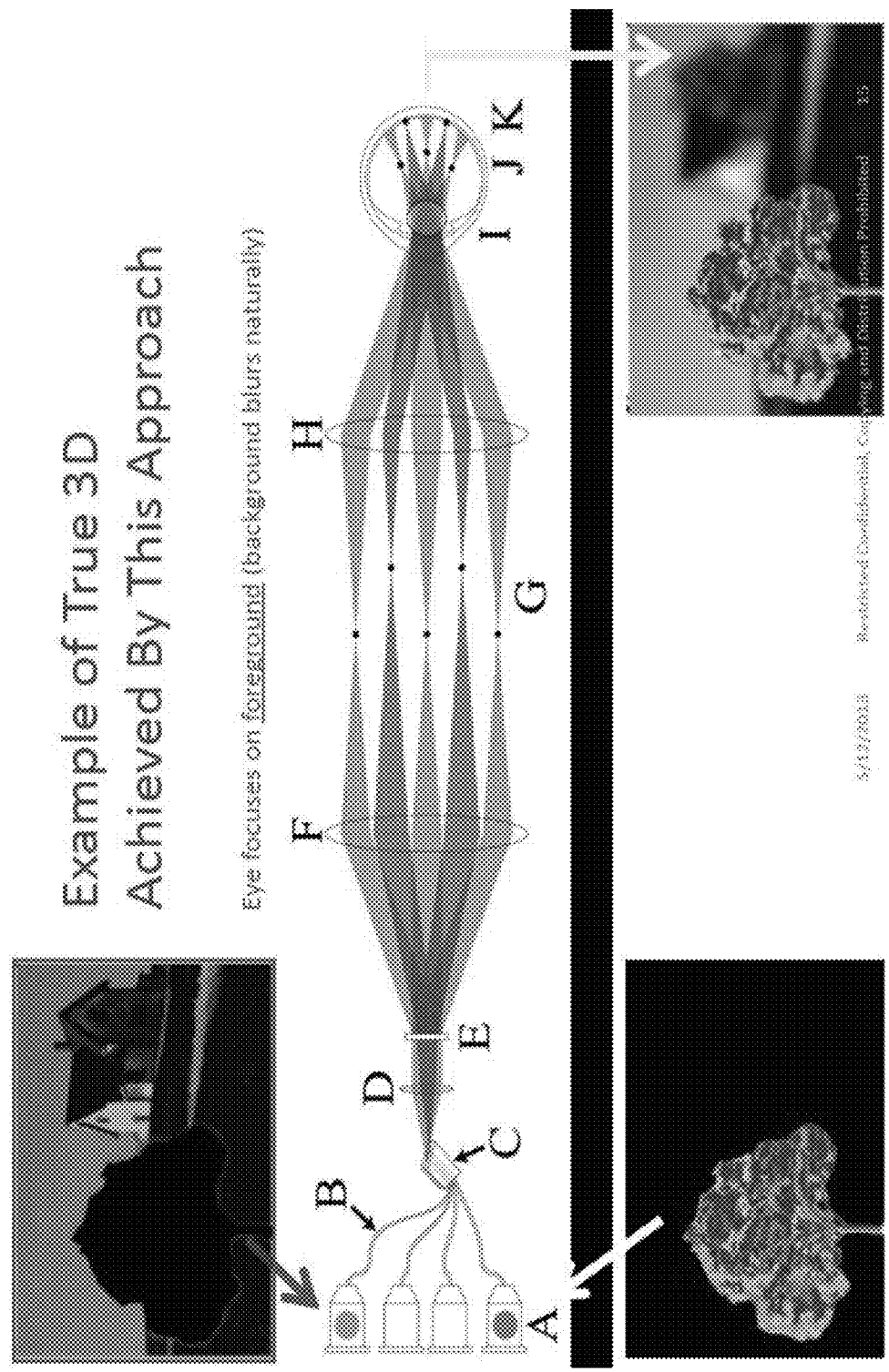
FIGS. 8A and 8B are diagrams of one example of true 3-D display provided by in eye projection.
Figure 8B:
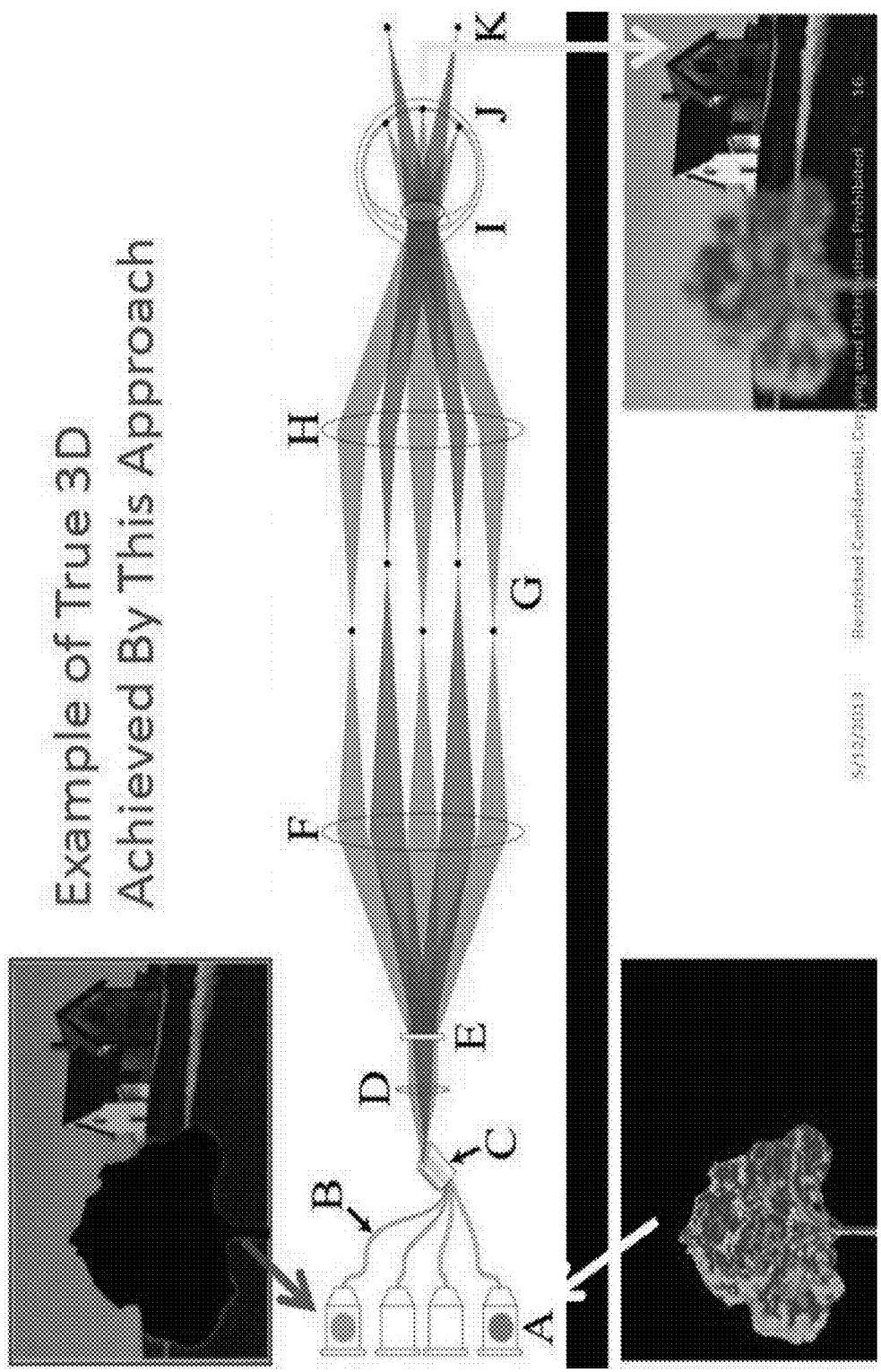

FIGS. 8A and 8B show one example of true 3D display provided by in eye projection. These figures illustrate how true 3D display may be achieved by in eye projection of images. The image delivery and display mechanism 302 includes a fiber bundle, a mirror scanner, and lens system to project images onto the retina of the user. FIG. 8A illustrates the image perceived by the user when focusing upon the foreground. FIG. 8B illustrates the image perceived by the user when focusing upon the background.

Method for Customer Interaction Using Mobile Information Gateway

Figure 9:
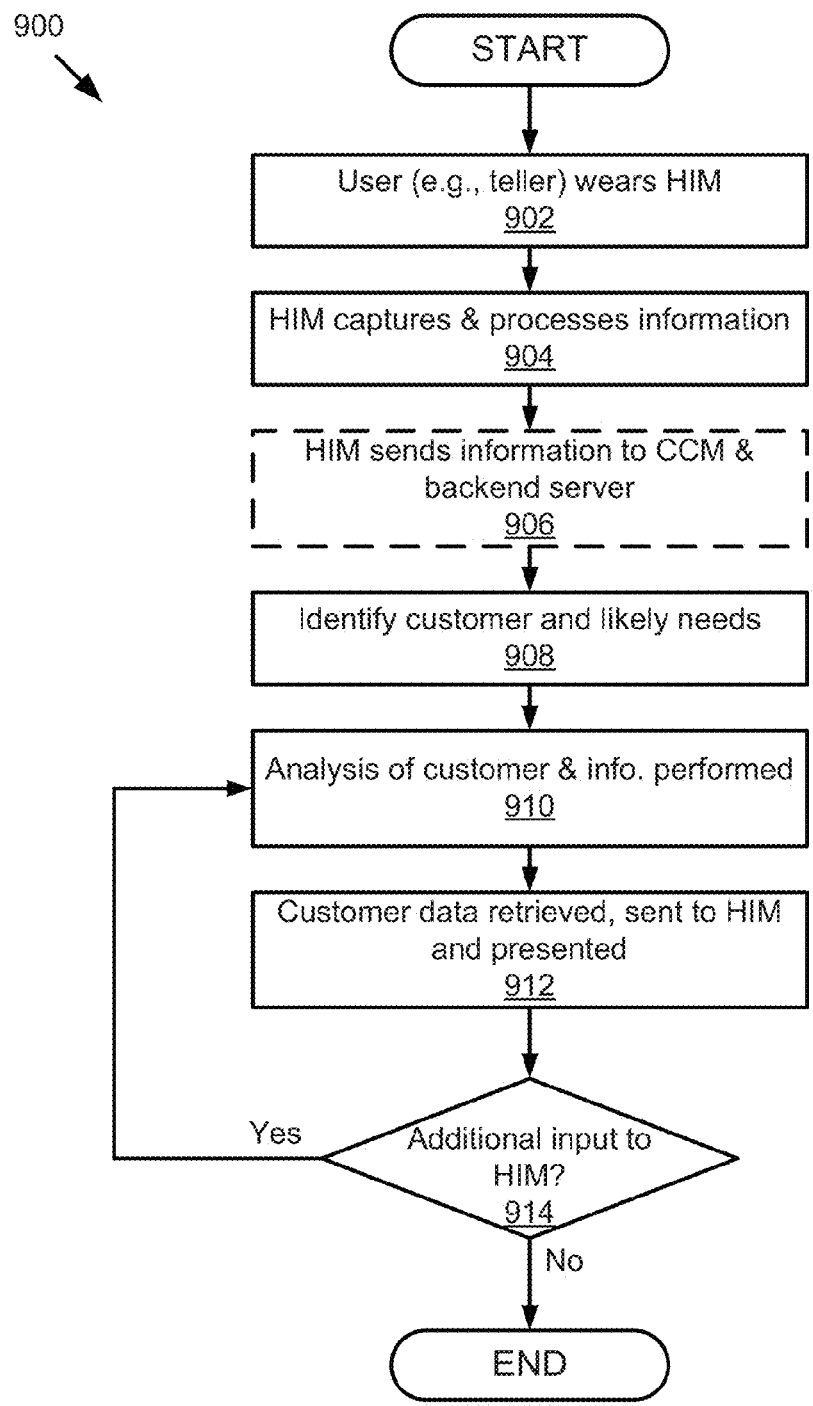
FIG. 9 is a flow chart of one embodiment of a method for asymmetrical use of the mobile information gateway.
Figure 10:
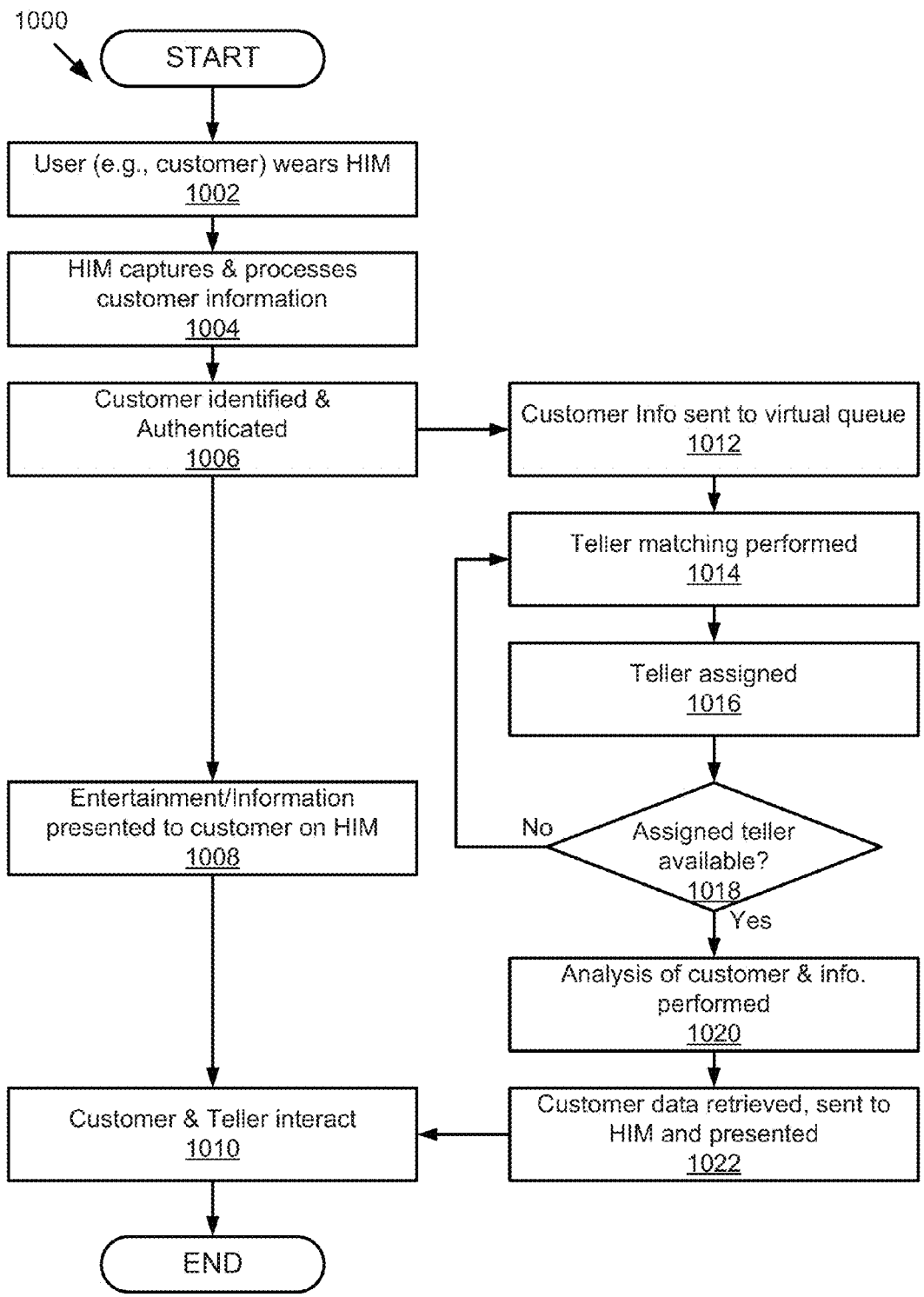
FIG. 10 is a flowchart of one embodiment of a method for symmetrical use of the mobile information gateway implementing a virtual queue.
Figure 11:
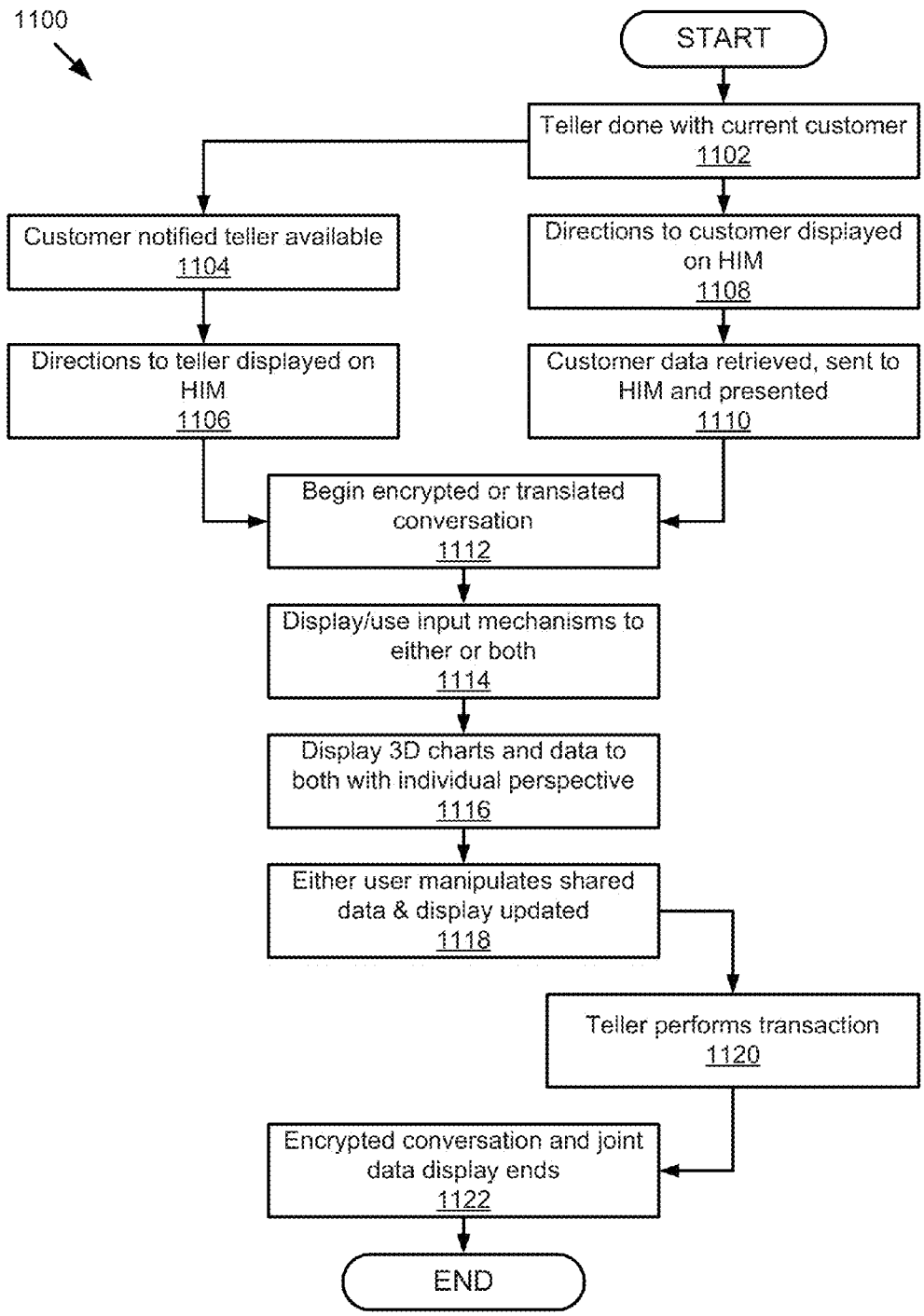
FIG. 11 is a flowchart of one embodiment of a method for symmetrical use of the mobile information gateway for servicing a customer using plurality of human interface modules.

Referring now to FIGS. 9-11, the methods of the present invention will be described in more detail. In general, there are two use cases for the present invention. First, in the asymmetrical case, a first user (e.g., a service representative or teller) is wearing the human interface module 102 and carrying the computing and communications module 104. The first user is interacting with a second user (e.g., a customer). The second user is not using or wearing a human interface module 102 or carrying the computing and communications module 104. Second, in the symmetrical case, both the first user and the second user are wearing and carrying their own respective human interface module 102 and computing and communications module 104. Other cases where more than two users each have their own human interface module 102 and the computing and communications module 104, and work together collaborative using new cooperation models and paradigms offered by the presented invention are considered extensions of the symmetrical case. FIG. 9 below describes a general method for the asymmetrical case where the first user, a teller, is wearing the human interface module 102 and carrying the computing and communications module 104. FIGS. 10 and 11 below describe methods for the symmetrical case where both the first user and the second user are wearing and carrying their own respective human interface module 102 and computing and communications module 104.

Furthermore, the methods of the present invention will now be described in the context of the specific vertical application of banking and financial services, in particular receiving services at the branch of a bank. This description is merely by way of example for illustration purposes and not by way of limitation. The methods of the present invention may be applied to other verticals such as medicine, law, retail, public services, etc. and the context of the operation of the methods is not intended to limit the human interface module 102 and the computing and communications module 104.

It should be understood that the method described above with reference to FIGS. 9-11 only identify some of the ways in which the human interface module 102 and the computing and communication module 104 allow the teller to provide enhanced services that are more tailored to the specific customer with which the teller is interacting. The human interface module 102 and the computing and communication module 104 may also be used to: provide any customer information and display it to the teller and/or the customer; provide a virtual teller; provide a service recommendation engine; provide customer-teller matching; provide a private communication channel between the teller in the customer; record/ monitor delivery of services by tellers including active intervention to train or correct teller behavior; provide immediate feedback on service wait times and eliminate queues; and provide a new service model including a greeter/triage person and a problem solver person.

Referring now to FIG. 9, one embodiment of a method 900 for asymmetrical use of the mobile information gateway is described. As noted above, the method will be described in the context of a service representative or teller wearing the human interface module 102 and carrying the computing and communications module 104 interacting with a customer not having or using a dedicated human interface module 102 and computing and communications module 104. Use of the human interface module 102 and the computing and communications module 104 by the teller provides a number of significant advantages. First, the teller may assist the customer anywhere and in any way inside the branch since they are not constrained to working with a desktop computer or terminal—this functionality is provided by the human interface module 102 and the computing and communications module 104. This completely eliminates the requirement that any customer wait in any queue to be served. Second, the teller can perform existing services every time because the human interface module 102 and the computing and communications module 104 enable identification (iris identification), authentication and retrieval of customer information in ways not possible with existing verification data systems. For example, today if you forget your ATM card or don't have any identification you can only do a subset of activities, e.g., you can deposit a check but not discuss any particulars about your account (you may not even be able to make a deposit if you do not know your account number). With the teller having the human interface module 102 and the computing and communications module 104, all customers are automatically authenticated (through iris detection) and can be served fully as they need. Third, the teller can provide enhanced level of services because the human interface module 102 and the computing and communications module 104 allow the teller to access the relevant information about the customer and the bank's services are readily available in front (virtually) of the teller. Sophisticated analytics and recommendation engines can be used to provide pertinent options and guidance to the teller in real-time while they are interfacing with the customer—e.g., "customer has just won the lottery or received a large sum of money and it might be a good time to remind him of our investment services."

The method 900 begins with the user (e.g., teller) wearing 902 the human interface module 102. In the embodiment shown in FIG. 2, the user would wear the glasses including the human interface module 102 and also carry the computing and communications module 104. In other embodiments, the computing and communications module 104 may be positioned proximate to the human interface module 102 and coupled for communication and cooperation. Next, the human interface module 102 captures and processes 904 information. For example, the eye tracking camera 310 captures an image that is used by the human interface module 102, the computing and communications module 104, the backend service server 108 or combinations thereof to recognize the teller, authenticate the teller, authorize her to perform particular actions, and insert her into a list of persons available to service customers. Similarly the camera 308 may capture images of customers in the branch or entering the branch. In some embodiments, the human interface module 102 may perform some processing of the images to prepare them for distribution or perform initial steps of other types of processing. In some embodiments, the human interface module 102 is capable of doing all the processing and blocks 908, 910, 912 and 914 are performed by the human interface module 102. In such cases, step 906 is optional. However, in other embodiments the processing of information is divided among the computing and communication module 104 and/or the backend server 108. In such embodiments, the human interface module 102 sends 906 the captured information to the computing and communication module 104 and/or the backend server 108 as necessary.

The method 900 continues by identifying 908 the customer and her/his likely needs. The images captured by the human interface module 102 may be processed to identify and authenticate the customers as a particular individual. In some embodiments, the computing and communication module 104 and/or the backend server 108 process the captured information to determine an identity of the customer. The recognition may be rough approximations as to which customer has a matching identity or it may be very specific identifying a particular individual by name and other attributes. For example, facial recognition, iris recognition, facial/tone recognition may be performed on the images. The images may also be processed to identify what the customer likely needs. For example, if the customer is holding a check, information suggesting that the customer wants to make a deposit may be sent and displayed on the human interface module 102. The analysis of what the customer likely needs may also be determined from information about the customer's accounts, recent transactions, information about the customer generally available on the Internet or information about the customer available in social networks. Furthermore, identifying 908 the customer may include determining the location of the customer within the bank branch. The backend service server 108 may be in communication with the location server or access to location services that can be used to provide a specific location of the customer within the bank branch. This information may be retrieved by the backend service server 108 and transmitted for display on the human interface module 102. The identification of the customer and her needs based on an image captured by the human interface module 102 may be performed entirely on the human interface module 102, entirely on the backend service server 108, entirely on the computing and communications module 104 or cooperatively amount two or more them.

The method 900 continues to perform analysis 910 of the customer and the information received. For example, the customer and her likely needs may be provided to a service recommendation engine. The service recommendation engine can generate a recommendation for product or service based upon the detected state of the customer via the human interface module 102 and/or data about the user in the computing and communications module 104 or the backend service server 108. The service recommendation engine advantageously generates recommendations and provides up selling opportunities for additional or related service that are specifically adapted to the customer based upon the information captured and processed by the mobile information gateway 100. For example, refinance, mortgages, student loans, insurance, investment services, other banking services, accounting services, tax services, legal services, travel and rental car services, accommodations, donations to charities are just a few ancillary services that may be recommended to banking customer. In some embodiments, the computing and communication module 104 and/or the backend server 108 determines a service preference of the first customer; determines a service capability of a plurality of tellers; selects one of the plurality of tellers that has a service capability similar to the service preference of the first customer; and then sends information for the customer to the human interface module of the selected one of the plurality of tellers for display (see also block 912 below). Other forms of teller matching as described below with reference to FIG. 10 may also be performed as part of the analysis 910. The analysis 910 of the customer based on an image captured by the human interface module 102 may be performed entirely on the human interface module 102, entirely on the backend service server 108, entirely on the computing and communications module 104 or cooperatively amount two or more them.

Next, the method 900 retrieves 912 customer data and information and sends it to the human interface module 102 for presentation. For example, account information about the customer may be retrieved and sent to the human interface module 102. In this manner, the teller is immediately presented with information that is related to the customer such as whether their account is overdrawn or whether an account has a high balance and another account or different type of account should be open. Depending on the bank's policies, a picture of the customer could also be retrieved and sent for presentation to the human interface module 102 so that the teller can be assured that they are interacting with the correct customer. The retrieval of customer data may be performed entirely on the backend service server 108, entirely on the computing and communications module 104 or cooperatively on both of them. The delivery of the data is performed by the computing and communications module 104. The data is received by the human interface module 102 and then presented using the image delivery and display mechanism 302. Examples of the presentation of information related to a particular customer by the human interface module 102 overlaid upon a field of view are described in more detail below with reference to FIGS. 12A-12E.

Once the information is presented to the teller via the human interface module 102, the teller can interact with the customer in a normal fashion. The teller can use the human interface module 102 to input additional information such as requesting a transaction or an activity for the customer, requesting additional information, updating records, etc. The teller can input such requests via gestures, eye movement, voice commands, or other input mechanisms provided by the human interface module 102. The method determines 914 whether the teller has input any additional information or commands to the human interface module 102. If so, the information request is processed by the human interface module 102 and the method continues returns to step 910 to analyze and process the new information requests. If no additional commands are input are provided to the human interface module, the method is complete and ends.

FIG. 10 is a flowchart of one embodiment of a method 1000 for symmetrical use of the mobile information gateway 100 implementing a virtual queue. The symmetric case represents an entirely new set of activities and interactions that become possible with this unprecedented mode of engagement. In addition to the advantages described above for the symmetrical case and FIG. 9, each teller can dive into any service scenario with the customer, whether it is showing them how to fill out some form, or the benefits of some new service or investment (with 3D models of how your assets grow in each situation), or cross-selling of other products ("dream vacations from sister travel company"). In particular, the symmetric case allows the teller and customer to: have private communications, have communication in different languages using an automated translation engine, work collaboratively on the same data; and eliminate queues for services.

It should be understood that the method 1000 of FIG. 10 assumes that the teller wears a first human interface module 102a sometime before interaction with the customer wearing a second human interface module 102b. Further, it is assumed that the teller wearing the first human interface module 102a has also been identified and authenticated in a process similar to that described below used to identify and authenticate the customer. Each of the first human interface module 102a and the second human interface module 102b has an associated first computing and communications module 104a and a second computing and communications module 104b, respectively. The method 1000 begins with the customer entering a bank branch, picking up or being given the second human interface module 102b and wearing 1002 the second human interface module 102b. In some embodiments, the second human interface module 102b may adapt the display for prescription eye glass wearers. As noted above, in some embodiments, the second human interface module 102b includes a substrate 202b onto which the image delivery and display mechanism 302, projects information overlaid on the field of view. The second human interface module 102b captures and processes 1004 captured information or customer information. For example, the eye tracking camera 310 of the second human interface module 102b captures an image of the customer's face for facial recognition or an image of the customer's iris for iris recognition. The audio input device 314 of the second human interface module 102b may capture an audio clip of the customer speaking for use in voice recognition. Additionally, the camera 308 of the second human interface module 102b may capture an image of the item in the customer's hand (e.g., cash, check, debit card, etc.) for use in determining the purpose of the customer's visit. The other input devices of the second human interface module 102b may collect other information such as voice commands or information, user gestures, or selection of menus that are captured and processed. The method 1000 continues by verifying the identity and authenticating 1006 the customer. In some embodiments, the captured information is processed to determine an identity of the user. The captured information may also be used to authenticate the user. The identity and authentication of the customer can be performed using any of the methods described above. The identification of the customer, the authentication of the customer and the analysis of her needs may be performed entirely on the second human interface module 102b, entirely on the backend service server 108, entirely on the second computing and communications module 104b associated with the second human interface module 102b or cooperatively on two or more of them.

After the customer has been identified and authenticated in block 1006, the method 1000 continues with two different processes in parallel. For the customer, entertainment or information is sent from the backend service server 108 or the second computing and communications module 104b to the second human interface module 102b and displayed 1008 for the customer. This information can be any variety of entertainment in which the customer is interested, a variety of offers available to the customer, information about policy changes, or other information that may be of interest to the customer. Furthermore, the customer may use the second human interface module 102b to surf the Internet, place audio or video calls, or perform various other computing functions enabled by the mobile information gateway 100. In some embodiments, the customer may use the second human interface module 102b to perform any number of conventional banking transactions (e.g., balance inquiries, transfers, deposits, etc.) such as those currently available through an automated teller machine. For example, the camera can capture images of checks or other documents and then the images can be used to process the corresponding transaction such as depositing a check. Payments can be made to a mortgage or other transactions like credit card payments can be processed in a similar fashion. Various other ATM transactions, such as transferring funds, requesting checks, making payment or balance inquiries could also be performed in this manner. In other embodiments, other advanced functions may be performed by using the second human interface module 102b interacting and communicating with the backend service server 108 to provide a virtual teller functionality. In some embodiments, the second human interface module 102b can be updated so that when the customer looks at their preferred teller, the teller's information (name, picture wait time etc.,) can be overlaid on the display of the second human interface module 102b. Thus the mobile information gateway 100 is particularly advantageous because it changes the way in which customers are serviced and allows customers to be entertained, informed or productive while waiting to be serviced. It should be noted that the present invention is particularly advantageous because the customer need not move and can remain in a single location to receive his or her services. Moreover, the same space can be used by one customer for different purposes as different times, and even used by multiple customers at the same time. For example, a designated space may be used by the customer to be entertained while waiting as described above, as well as later interact with the teller. Additionally, that same designated space maybe used by multiple customers at the same time since the mobile information gateway device 130 will present the information of each user privately so it is not viewable other customers. Thus, a white wall or background could be used as the background field of view by a single user for entertainment, conducting a transaction, interacting with a virtual teller at different times during their visit at the bank branch. That same a white wall or background could also be used by two or more customer as the background field of view as they are entertained or conduct financial transactions.

Another example is if the customer is looking at some special bank display screens (e.g. table, wall displays or signatures) and is interacting with it, e.g. flipping through some announcements, performing some visual-search related activities. Those bank-specific activities can be logged at the server and can be provided to the teller so the teller knows the interaction history of the customer prior to the official banking interaction.

In parallel, with block 1008, the steps of blocks 1012 to 1022 are performed. While the steps of blocks 1012 to 1022 are described below as being performed by the backend service server 108, it should be understood that they could alternatively be performed by the first computing and communications module 104a, the second computing and communications module 104b, the backend service server 108, or a combination of the three devices. It should also be understood that in different embodiments, some steps of blocks 1012 to 1022 are optional.

The method 1000 sends 1012 customer information including the customer ID and the requested/task to the backend server 108. The backend service server 108 performs 1014 teller-customer matching, and a teller is assigned 1016 to service the customer. A particular teller may be assigned to the customer based on a variety of factors including fit of teller's professional skills to customer's needs, professional skill level, experience level, personality match, age, gender, language preferences, prior experiences (positive or negative), etc. In the simplest of embodiments, tellers may merely be assigned based on expected or actual availability. Next the method 1000 determines 1018 whether the assigned teller is available. The availability of the assigned teller may be determined by the backend service server 108 polling the current activities being performed by the human interface module 102 of the assigned teller. If the assigned teller is not available, the method 1000 returns and re-performs steps 1014 and 1016 to find another teller. On the other hand, if the assigned teller is available, the method 1000 continues to step 1020. In some embodiments, the method 1000 may perform additional steps such as identifying a list of alternate tellers, ranking the tellers in order of popularity to the customer and providing the information about the tellers to the second human interface module 102b with information such as names, pictures, waiting times etc. The method 1000 then can offer the customer the option of waiting for the assigned teller or selecting a different teller from the list of alternates using the second human interface module 102b. In block 1020, an analysis of the customer and information is performed. The analysis can identify the customer, important information about the customer, preferences about the customer, the request/task the customer is there to perform, opportunities for selling additional services or products to the customer or any other information that will allow the teller to provide an enhanced experience. The customer data is then retrieved 1022 and sent to the first human interface module 102a of the teller and presented for use by the teller. For example, the customer may be identified in the field of view provided by the first human interface module 102a and arrows or other direction indicators guiding the teller to the customer may be presented on the first human interface module 102a. Similarly, the backend service server 108 may signal the second human interface module 102b of the customer to present arrows or other direction indicators to guide the customer towards the teller. Finally, the customer and the assigned teller interact 1010 to perform any type of transaction. The process for the customer and the assigned teller to interact is described in more detail below with reference to FIG. 11. Examples of the information presented on the respective human interface modules 102a, 102b and their corresponding substrates 202a, 202b are also described in more detail below with reference to FIGS. 13A and 13B. The positioning system 110 is used to determine the positions between the customer and teller and to provide signals on how to move through the physical space to meet face-to-face. The disclosed method 1000 is particularly advantageous in a number of respects. First, it eliminates the need for customers to wait in line for services. Second, there is no need for a customer to take a number for service because the process described is virtual and automatic, eliminating the need for the customer to make a request. Third, it allows the bank to use and the design the space in any number of ways to optimize customer service and efficiency. Finally, it eliminates lines so the bank can feel more like a destination that is desirable like certain stores.

Both parties, customer and teller, might want to go to a physical location, like a desk or counter, to type some text on a virtual keyboard. The positioning system assists on navigating to the physical location. Then the 3D camera captures the physical space, and the captured data enables accurate projection of a virtual keyboard on the display overlaying the physical space where the user is typing.

FIG. 11 is a flowchart of a method 1100 for symmetrical use of the mobile information gateway 100 for servicing a customer using plurality of human interface modules. Servicing of the customer begins when the teller completes 1102 an interaction with a customer. The customer is notified 1104 that the teller is available. For example, a message may be displayed on the second human interface module 102b used by the customer. The second human interface module 102b may also display 1106 directions to the assigned teller. In parallel, directions to the customer are displayed 1108 on the first human interface module 102a used by the teller. Customer data is also retrieved 1110, sent to the first human interface module 102a and presented to the teller. When the teller approaches the customer, the first human interface module 102a may display the customers information, her preferences, and services/products to recommend and why.

Once the teller and the customer meet, they begin an encrypted conversation. The conversation and information may be passed between the teller and the customer with the teller and customer using their respective human interface module 102a, 102b, respective computing and communications module 104a, 104b and the backend service server 108. The encrypted conversation may use a real-time voice changer/scrambler in the human interface modules 102a, 102b. In some embodiments, the respective computing and communications modules 104a, 104b compute a scrambling/changing signal, possibly based on the captured input voice and the human interface modules 102a, 102b and output the scrambling/changing signal. This is particularly advantageous because it ensures that the conversation between the customer and the teller will be private. Furthermore, respective human interface modules 102a, 102b, respective computing and communications modules 104a, 104b and the backend service server 108 may provide language translation services so that both the teller and the customer may speak in the language which they are most comfortable. This also enables a teller who only speaks a single language, such as English, to service any number of clients that speak other languages. Both the teller and the customer can use their respective human interface module 102a, 102b to input commands 1114 or information, or select information for display. It should be understood that the information provided to the respective human interface modules 102a, 102b may be the same or different based upon the user. For example, a first set of data which includes the financial data of the customer may be displayed both on the human interface module 102a of the teller and the human interface module 102b of the customer. In another example, the first human interface module 102a may show a second set of data such as bank use only information that is not visible or presented on the second human interface module 102b of the customer. The method 1100 continues by presenting or displaying 1116 3D charts (e.g., displaying how savings would look like in a number of years, etc.), 3D models (e.g., displaying a new housing complex the bank is trying to sell) or data to both the first human interface modules 102a and the second human interface modules 102b. Other examples include 3D charts, pie charts and models of retirement accounts, expected performance, loan amortization, effect of extra payments beyond interest, mortgage calculations, credit card transactions and effects, etc. This is particularly advantageous because each user views the 3D charts from their own perspective. While the data is the same, each user's perspective on the 3-D charts is different depending on their location relative to the chart. Moreover, each user can interact 1118 with their respective human interface module 102a, 102b to manipulate the charts, see changes, input changes, etc. This provides a type of interaction heretofore not available in the banking context. It should be understood that in blocks 1114, 1116, 1118 any type of information may be presented to the teller and/or the customer such as special offers, notifications, limited promotions, recommendations, etc. The method 1100 completes with the teller performing 1120 a transaction using the first human interface module 102a, and the encrypted conversation and joint display ending 1122.

In some embodiments, the human interface module 102a, 102b could also display "shared screens," where one part is the common display that both parties see, and another one is a "private" part. That way the user can look up special account information while looking at the common charts. The teller can also have a shared and a private display area.

FIGS. 12A-12E are graphic representations of a field of view of an area through a substrate 202 of the human interface module 102 with information overlaid upon the substrate 202.

Figure 12A:
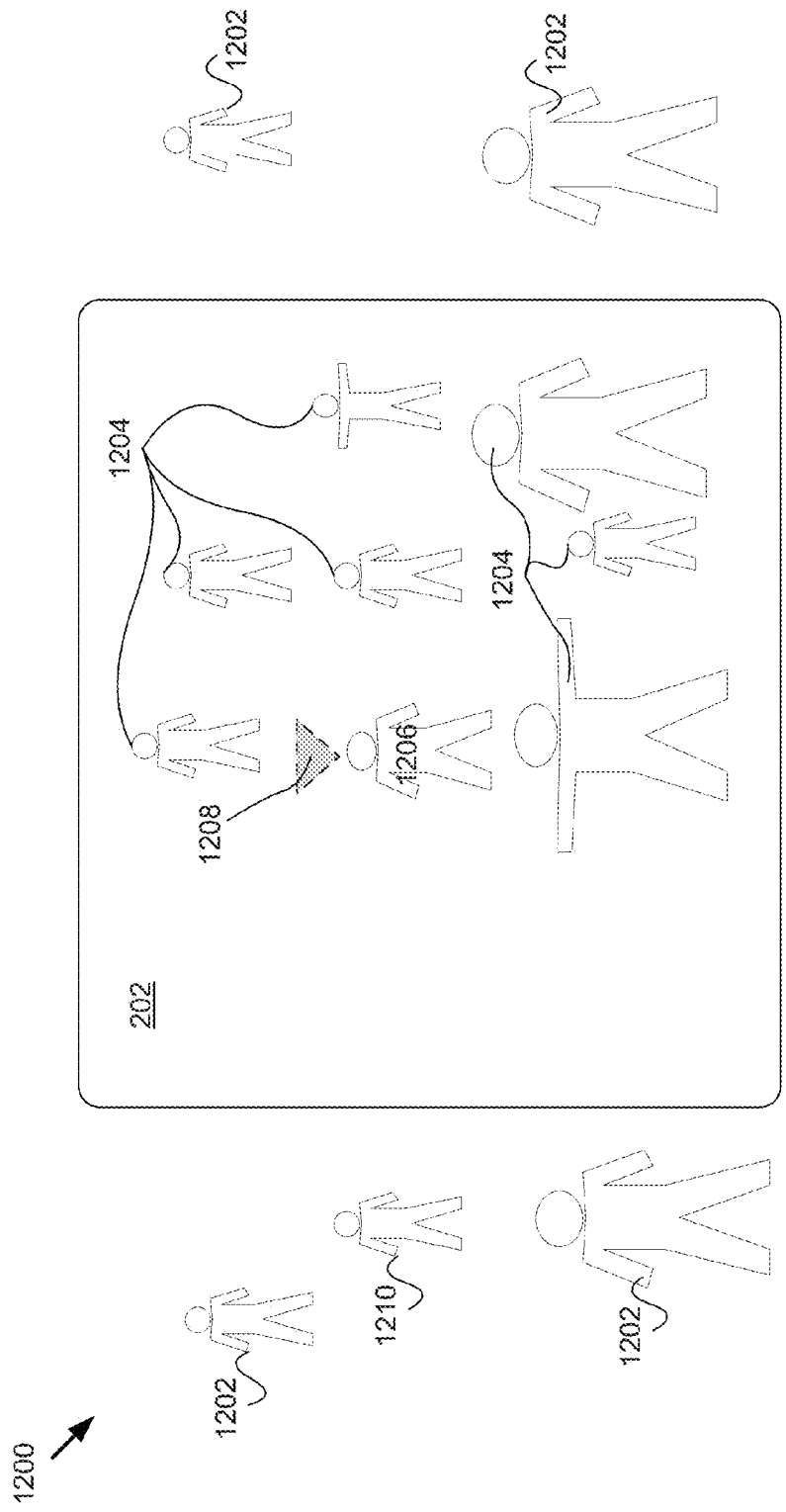
FIGS. 12A-12E are graphic representations of a field of view of an area through a substrate of the human interface module with information overlaid upon the substrate.

Referring now to FIG. 12A, a graphical representation of a service area 1200, for example a bank lobby, is shown. In the bank lobby, there are a plurality of customers 1202, 1204, 1206 and 1210. The field of view is defined by the substrate 202 through which the user of the human interface module 102 views portions of the area 1200. As shown, some of the customers 1202, 1210 are outside of that field of view while other customers 1204, 2006 are within the field of view. For convenience and ease of understanding, only a single substrate 202 is shown in FIG. 12A; however, it will be recognized that using the embodiment of the human interface module 102 of FIG. 2, there would be a pair of substrates 202 for binocular viewing. In such embodiments, different or the same information may be presented on the different substrates 202.

FIG. 12A illustrates an example where the field of view provided by the substrate 202 includes an image of a portion of the service area 1200 having a plurality of customers 1204, 1206. The human interface module 102, in particular the image delivery and display mechanism 302, projects a call out 1208 onto the substrate 202. FIG. 12 A illustrates this projected information about an identified customer 1206 with dashed lines to indicate that is not part of the background scene that includes the customers 1204, 1206. It should be understood that while the call out 1208 is a triangle above the head of the identified customer 1206, the call out 1208 could take any number of other forms with different shapes, colors, sizes, and positions. For example, the call out 1208 in other embodiments could be a square around the identified customer 1206. The present invention advantageously performs the steps of the method described above with reference to FIG. 9, and then once a customer has been identified, projects the call out 1208 to indicate which customer the teller wearing the human interface module 102 should approach and with which begin to interact.

Figure 12B:
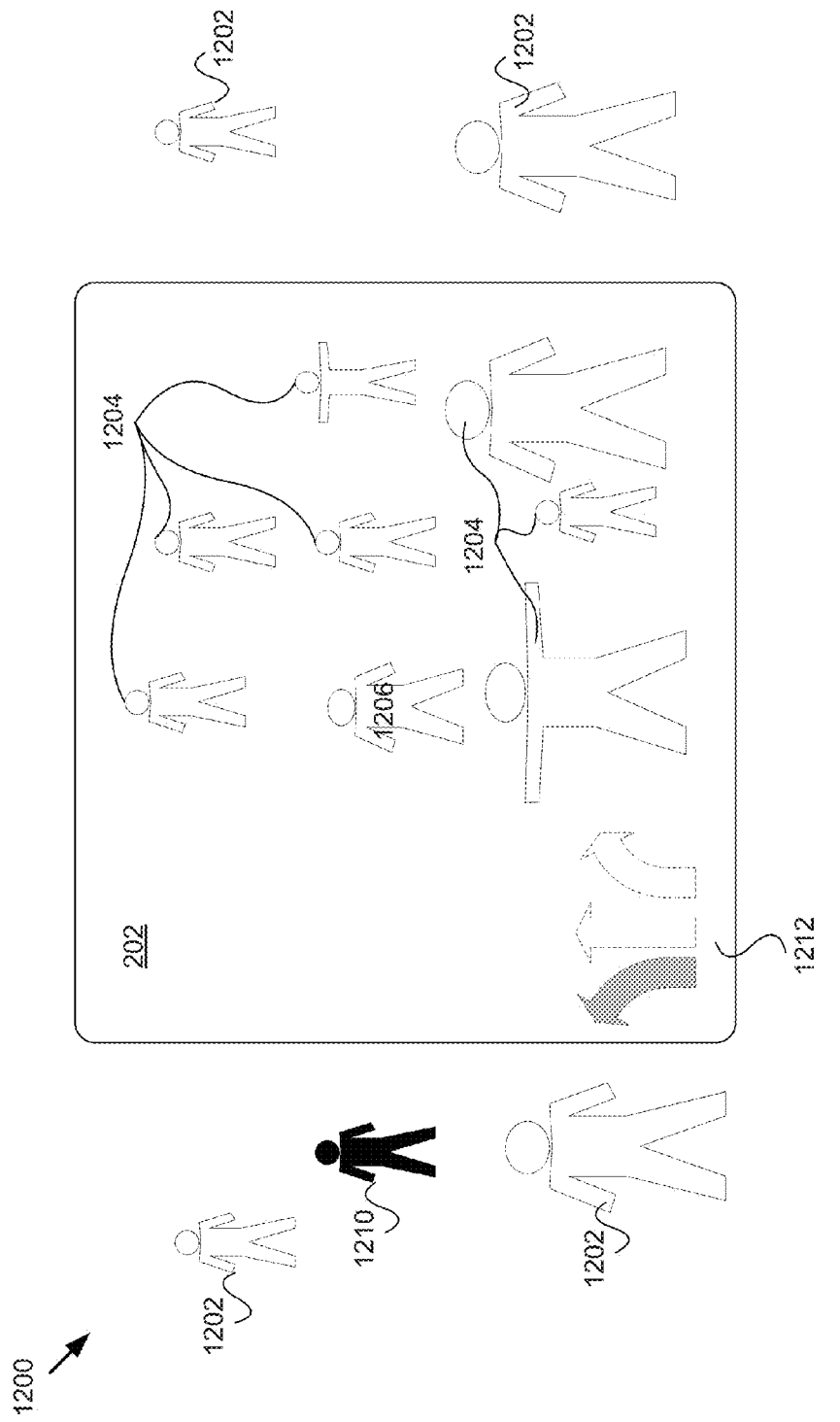

FIG. 12B illustrates an example where the human interface module 102 has been used to capture images of the service area 1200 and provides a directional indicator 1212 to travel to meet the customer 1210. The process described above with reference to FIG. 9 has been performed and has identified a particular customer 1210 with which the teller wearing the human interface module 102 needs to service. In this example, a directional indicator 1212 is projected onto the transparent substrate by the image delivery and display mechanism 302. For example, the directional indicator 1212 can be a symbol such as an arrow indicating which direction that the wearer of the human interface module needs to travel to meet the customer 1210. The directional indicator 1212 could be a series of arrows as shown with one of the arrows highlighted. In other embodiments, only a single arrow indicating which direction the user should move can be provided. It should be understood that the directional indicator could have a variety of other formats, positions, and colors other than that shown in FIG. 12B. For example, the directional indicator 1212 may be simply an arrow on the left side, top side or right side of the substrate 202.

Figure 12C:
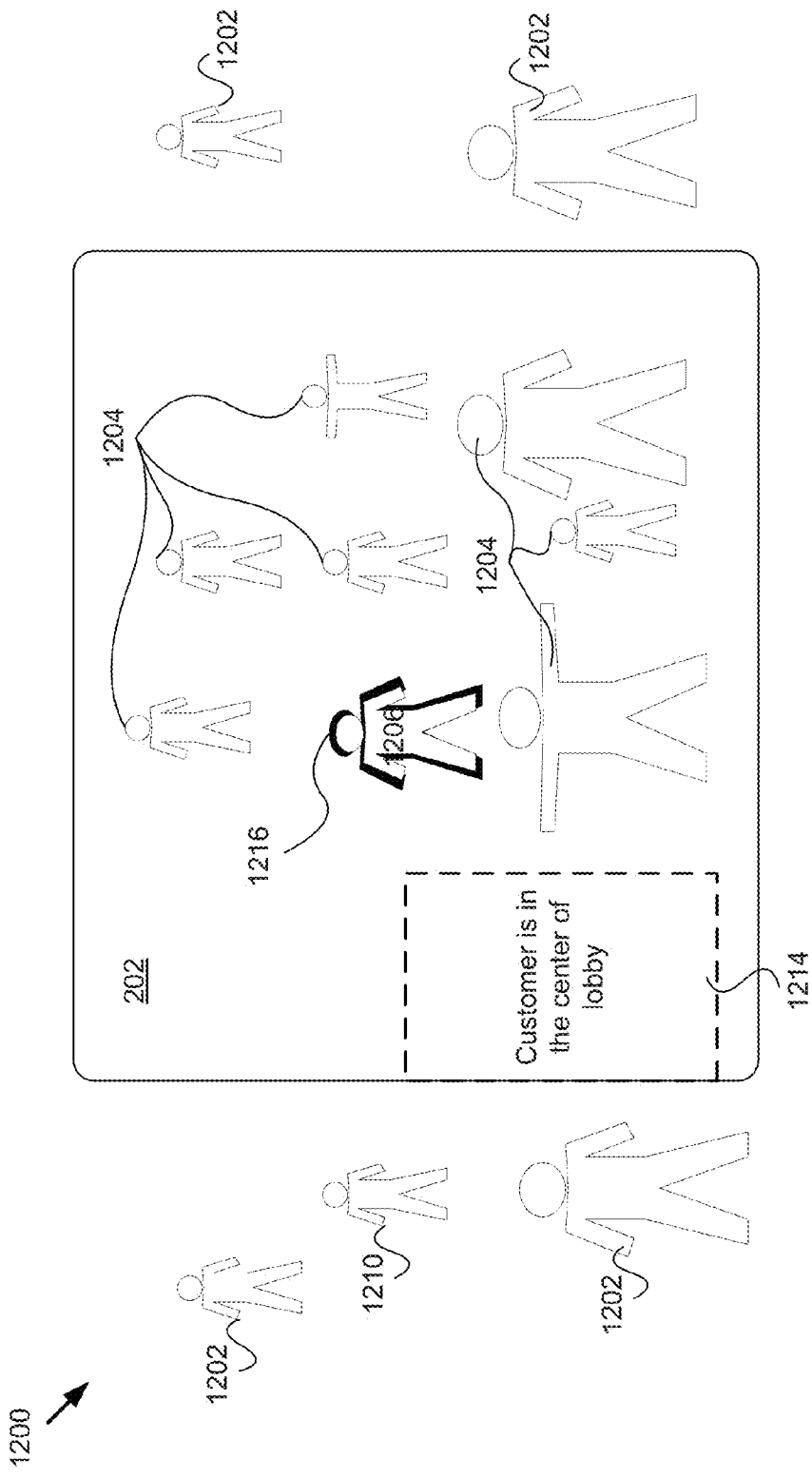

FIG. 12C illustrates an example where the human interface module 102 has been used to capture images of the service area 1200 and provides a location 1214 or 1216 of the customer 1206. In this example, an area 1214 is provided in which the image delivery and display mechanism search 302 can display the location of the customer 1206. For example, the location information can merely be a description such as "customer is in the center of the lobby" that is displayed in area 1214. In addition to or in the alternative, the location information may be highlighting 1216 such as a border about the identified customer. This is particularly advantageous because it allows the teller to quickly and easily identify the customer 1206 with which they are supposed to meet and interact. It should be understood that in other embodiments, the area 1214 may also be used to present other information including but not limited to a service or offer to recommend to the customer 1206, or an identification that a particular teller should or should not attempt to interact with the customer 1206. The highlighting 1216 also could be replaced by an image or other information but nothing the less illustrates how the information is displayed transparently overlaid upon the field of view of the first customer sized relatively similar to the field of view and positioned proximate the first customer in the field of view.

Figure 12D:
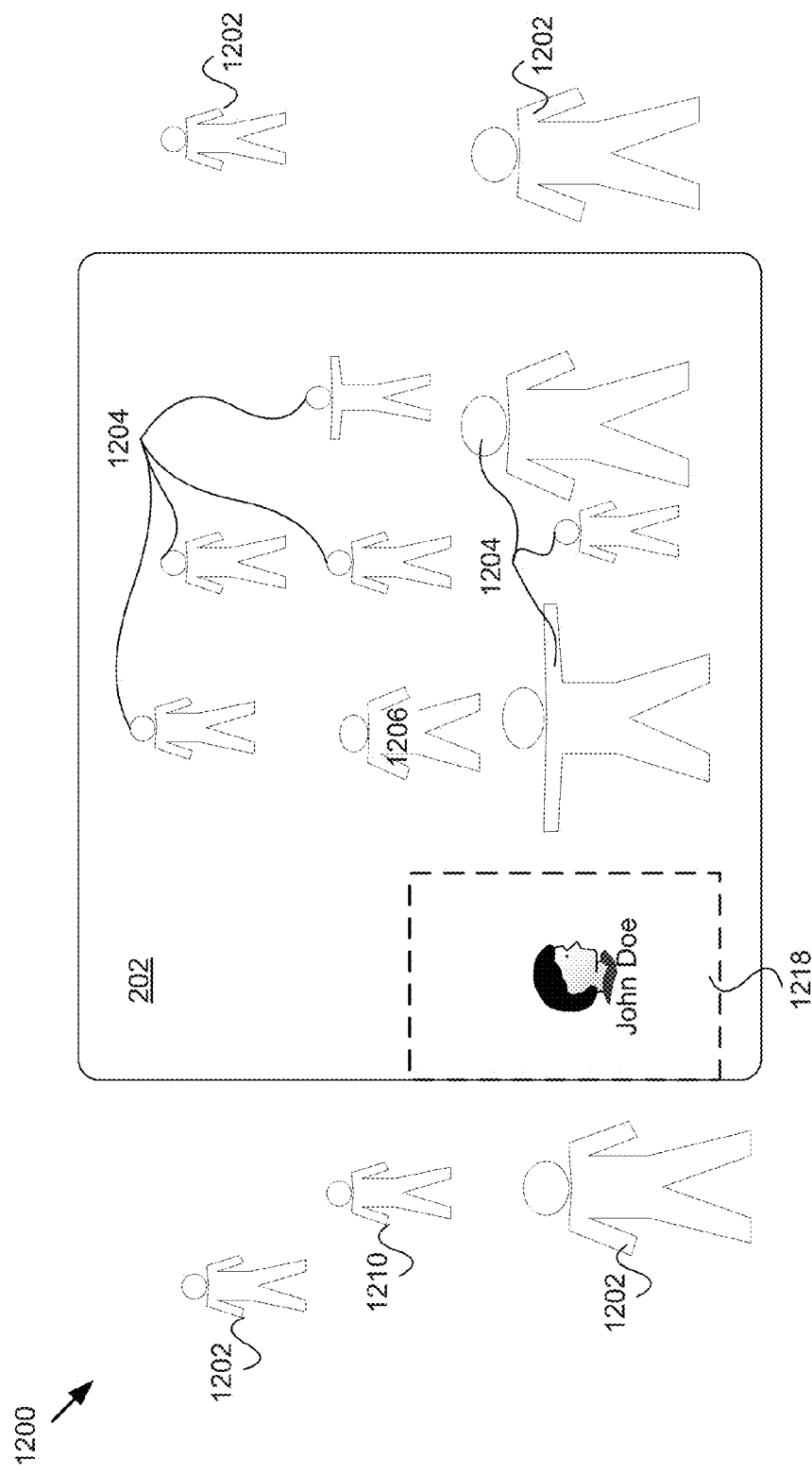

FIG. 12D illustrates an example where the human interface module 102 has been used to capture images of the service area 1200 and the area 1214 provides an image 1218 of the customer 1206. This is advantageous because it allows the teller to double check and easily recognize the customer which they are supposed to be servicing.

Figure 12E:
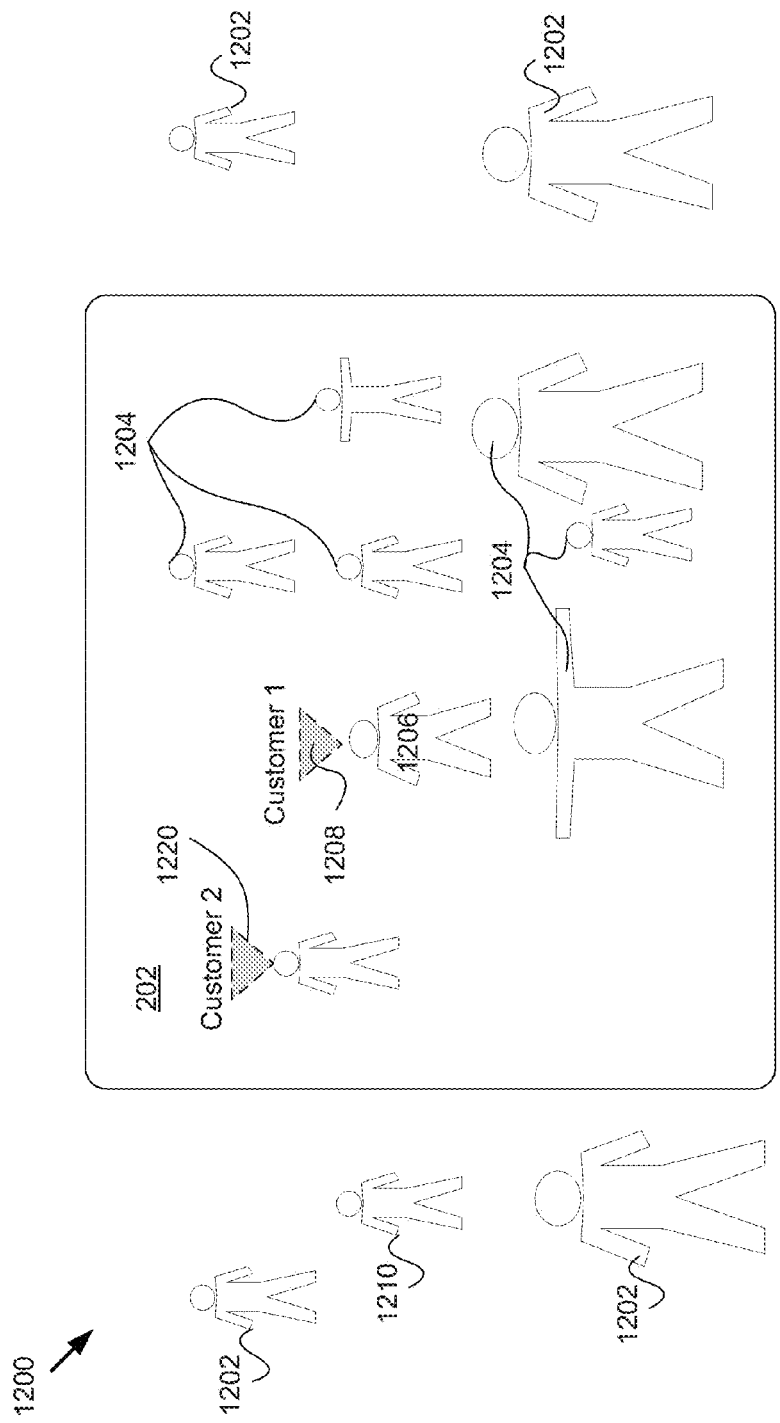

FIG. 12E illustrates an example where the human interface module 102 has been used to capture images of the service area 1200 and a plurality of customers have been identified. Each of the identified customers has an associated call out 1208, 1220. FIG. 12E is used to illustrate that the system of the present invention may be used to identify any number of customers. Further, while only two customers are identified, all the customers viewable within the field of view provided by the substrate 202 could also be identified. Furthermore, the system might assign priorities in which customers should be serviced in such an embodiment where all the customers are identified. Those identifications and priorities could be projected onto the substrate 202 for use by the teller in a similar manner to the call outs 1208 and 1220 shown.

Figure 13A:
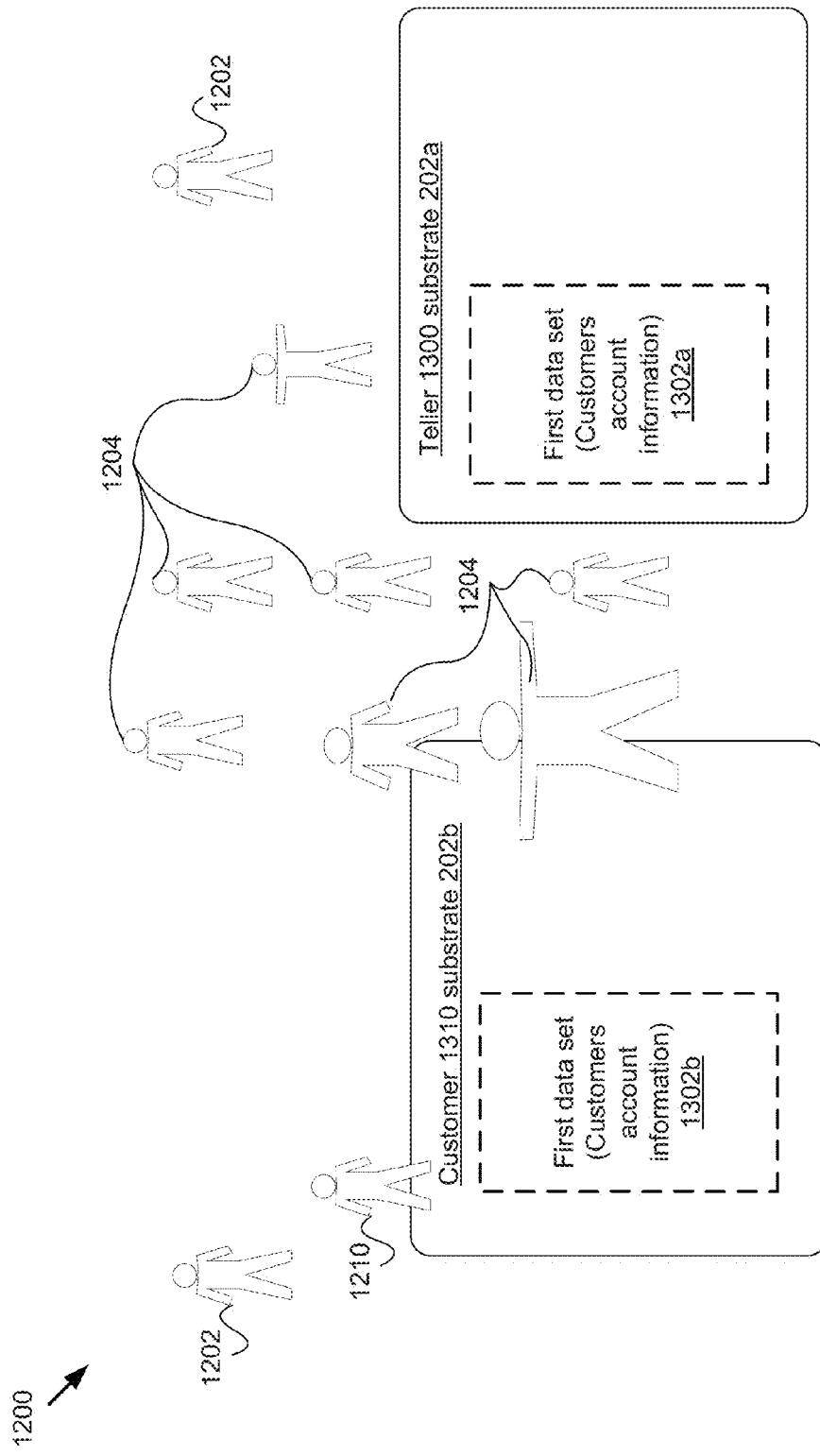
FIGS. 13A-13B are graphic representations of a field of view of an area through a first substrate of a first human interface module and a second substrate of a second human interface module with information overlaid upon each substrate.
Figure 13B:
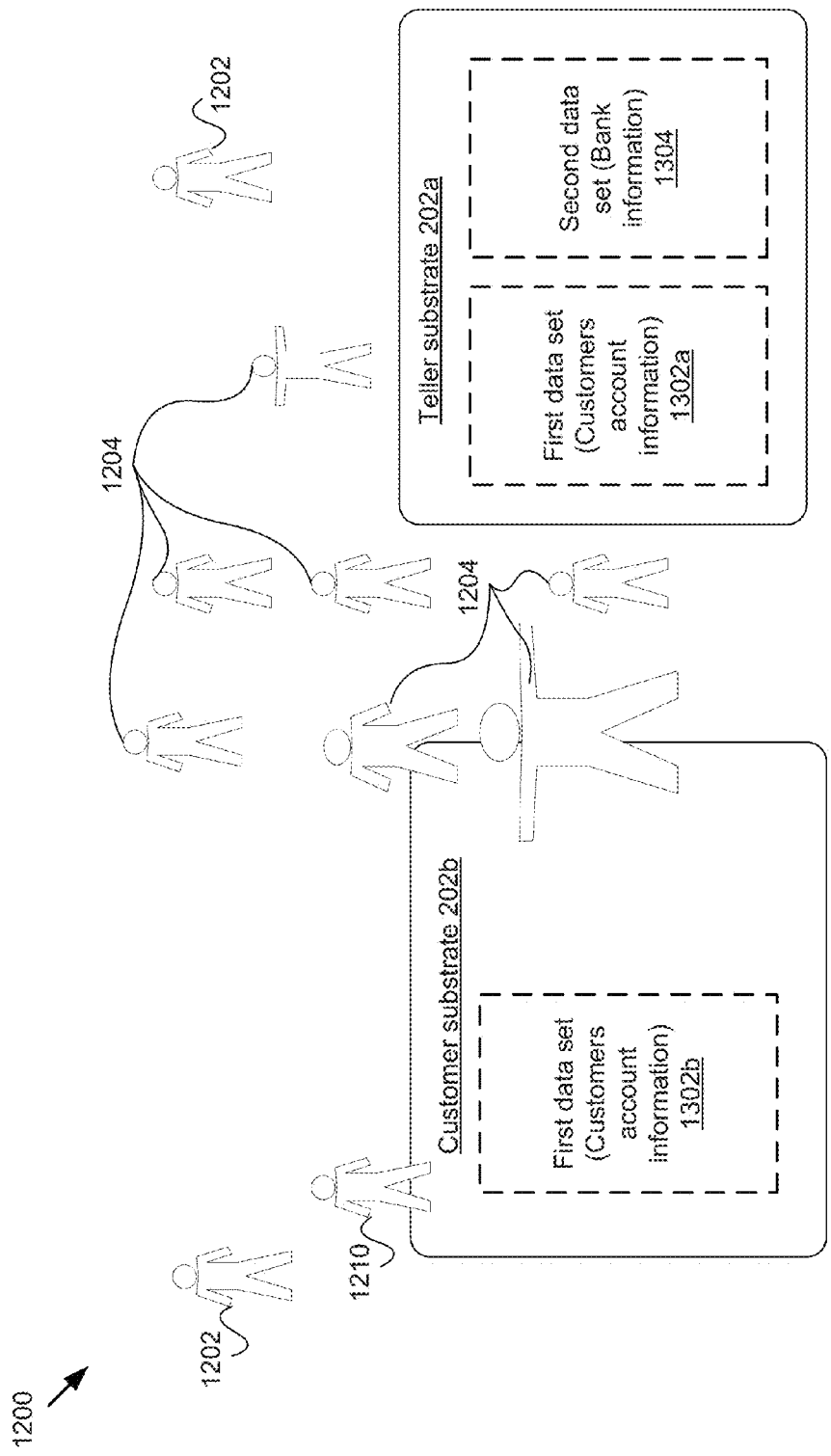

FIGS. 13A and 13B are graphic representations of a field of view of a service area 1200 through a first substrate 202a of a first human interface module 102a for a teller 1300 and a second substrate 202b of a second human interface module 102b for a customer 1310 with information transparently overlaid upon each substrate 202a, 202b. As illustrated by FIG. 13A, both users (the teller 1300 and the customer 1310) use their corresponding human interface module 102A, 102B to view a service area 1200 such as the lobby of a bank. The lobby of the bank may include any number of other customers 1202, 1204 and 1210. Each of their respective human interface modules 102a, 102b includes a substrate 202a, 202b. For example, both the teller 1300 and the customer 1310 wearing a pair of mobile information gateway glasses, and the lenses of the glasses provide the substrates 202a, 202b. Each of the human interface modules 102a, 102b is able to display a first set of data 1302a, 1302b upon their respective substrates 202a, 202b as depicted in FIG. 13A. This is advantageous in a number of respects. First, as with the other use cases described above with reference to FIG. 12, the information is advantageously overlaid upon the field of view provided by the substrate 202a, 202b so that the user 1300, 1310 may see both the other customers 1202, 1204 and 1210 as well as the information presented on the substrate 202a, 202b. Second, the information presented to each user 1300, 1310 is private in that only the teller 1300 using the first substrate 202a is able to view the first data set 1302a. Similarly, only the customer 1310 using the second substrate 202b is able to view the first data set 1302b. In this example, the first data set is the same for both the customer 1310 and the teller 1300 and represents the customer's account information. While each user 1300, 1310 is only able to view the data presented on his or her respective substrate 202a, 202b, the same data can be sent to both substrates 202a, 202b, thereby allowing both individuals to interact with the same data or share the same data. It should be noted that this information is visible only to the customer 1310 and the teller 1300. The other customers 1202, 1204 and 1210 are unable to view either substrate 202a, 202b, and thus have no access to the information being presented.

Referring now to FIG. 13B, another example of information presented on the first substrate 202a to the teller 1300 and the information presented on the second substrate 202b to the customer 1310 are shown. This example illustrates projection or display onto the first substrate 202a of a second data set 1304 such as bank information. The bank information could be confidential bank information used by tellers when interacting with customers, for example the customer's credit history, loan status, credit card status, etc. The bank information could also be offers or promotions specifically for this customer 1310. As illustrated in FIG. 13B, the second data set 1304 is only projected on the first substrate 202 and therefore is only visible by the teller 1300, and not the customer 1310 or the other customers 1202, 1204 and 1210. It should also be noted that the second data set 1304 is displayed on the first substrate 202a in addition to the first data set 1302a.

Figure 14:
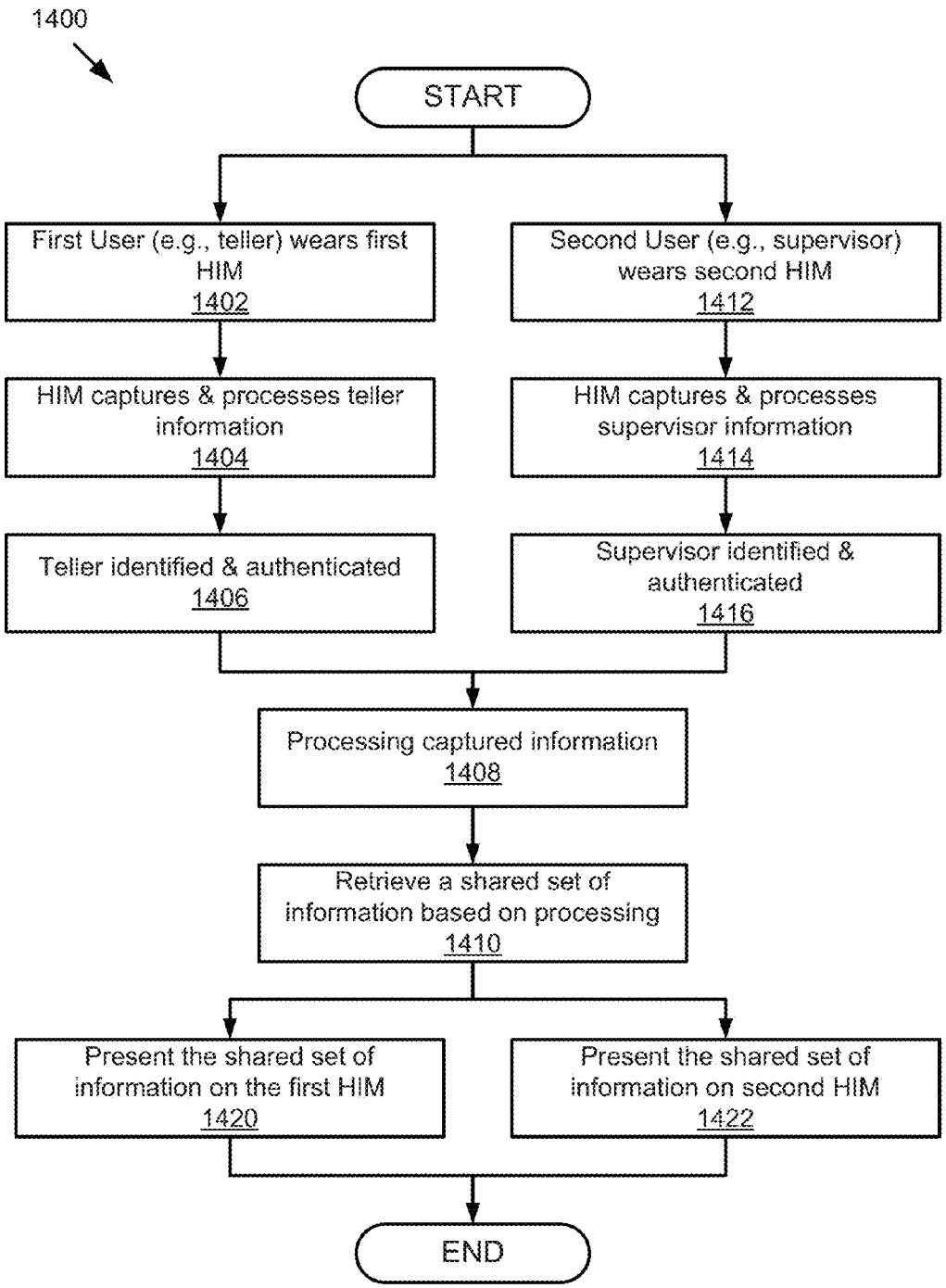
FIG. 14 is a flowchart of one embodiment of another method for symmetrical use of the mobile information gateway for use by representatives of a financial institution.

Referring now to FIG. 14 is a flowchart of a method 1400 of another example of symmetrical use of the mobile information gateway 100. This example will be described for augmented interaction for financial services between a first user and a second user. For clarity and ease of understanding, the method 1400 will be described with a first user, for example a teller, utilizing the first human interface module 102a; and a second user, for example a supervisor, utilizing the second human interface module 102b. This is merely by way of example and it should be understood that there could be several users each wearing a corresponding human interface module 102 such as in the back office processing of a financial institution where there are numerous employees.

The method 1400 begins with the first user (e.g., a teller) wearing 1402 a first human interface module 102a. The first human interface module 102a captures and processes 1404 teller information, then identifies and authenticates 1406 the teller. These steps are similar to blocks 1002, 1004 and 1006 described above with reference to FIG. 10 so that description will not be repeated here. The method 1400 also has the second user (e.g., supervisor) who wears 1412 a second human interface module 102b. The second human interface module 102b captures and processes 1414 supervisor information, and then identifies and authenticates 1416 the supervisor. It should be understood that blocks 1402, 1404 and 1406, can be performed in parallel or serial with blocks 1412, 1414, and 1416. Furthermore, blocks 1402, 1404, 1406, 1412, 1414 and 1416 can be performed with significant time gaps between them. For example, the teller may perform blocks 1402, 1404 and 1406, while the supervisor performs blocks 1412, 1414 and 1416 hours or much later or earlier.

Once both the supervisor and the teller have been identified and authenticated, the method 1400 continues by processing the captured information 1408. Either or both of the first human interface module 102a used by the teller or the second human interface module 102b used by the supervisor may be used to capture information of various types, as this has been described above. The information captured by these devices is processed in block 1408. As has been noted above, the processing may occur at the human interface module 102, the computing and communication module 104 or the backend service server 108. Based on the processing in block 1408, a shared set of information is retrieved 1410. Example processing 1408 and retrieval 1410 are described in more detail below with reference to FIGS. 15A and 15B. The method 1400 continues by presenting 1420, 1422 the shared set of information on both the first human interface module 102a and the second human interface module 102b. It should be noted that for both the teller and the supervisor, the shared set of information is overlaid upon a field of view of the teller and the supervisor by their respective first human interface module 102a, 102b. After presentation the method 1400 is complete and ends.

Figure 15A:
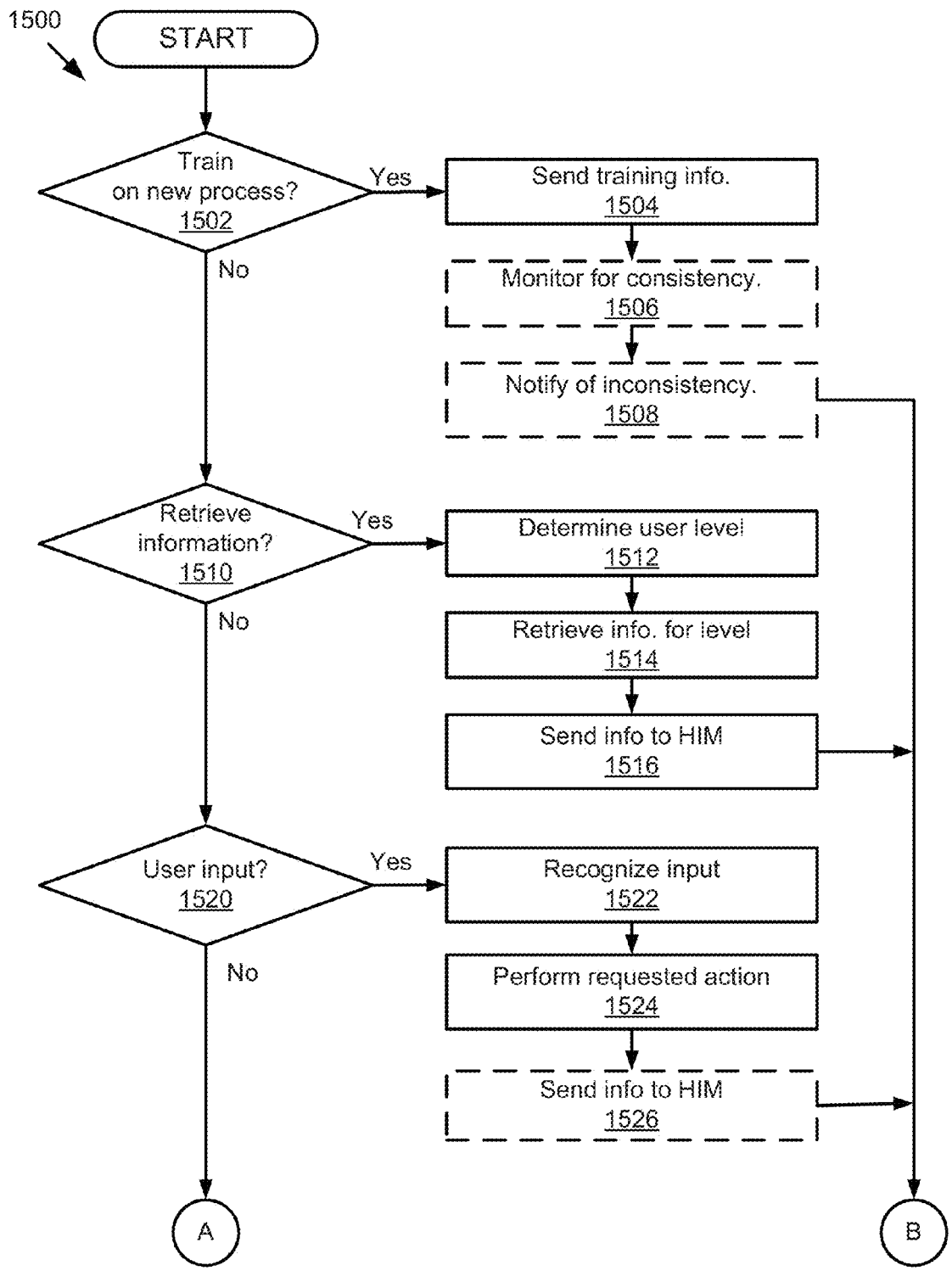
FIGS. 15A and 15B are a flowchart of one embodiment of a method for processing captured information and retrieving a shared set of information for augmented interaction financial services.
Figure 15B:
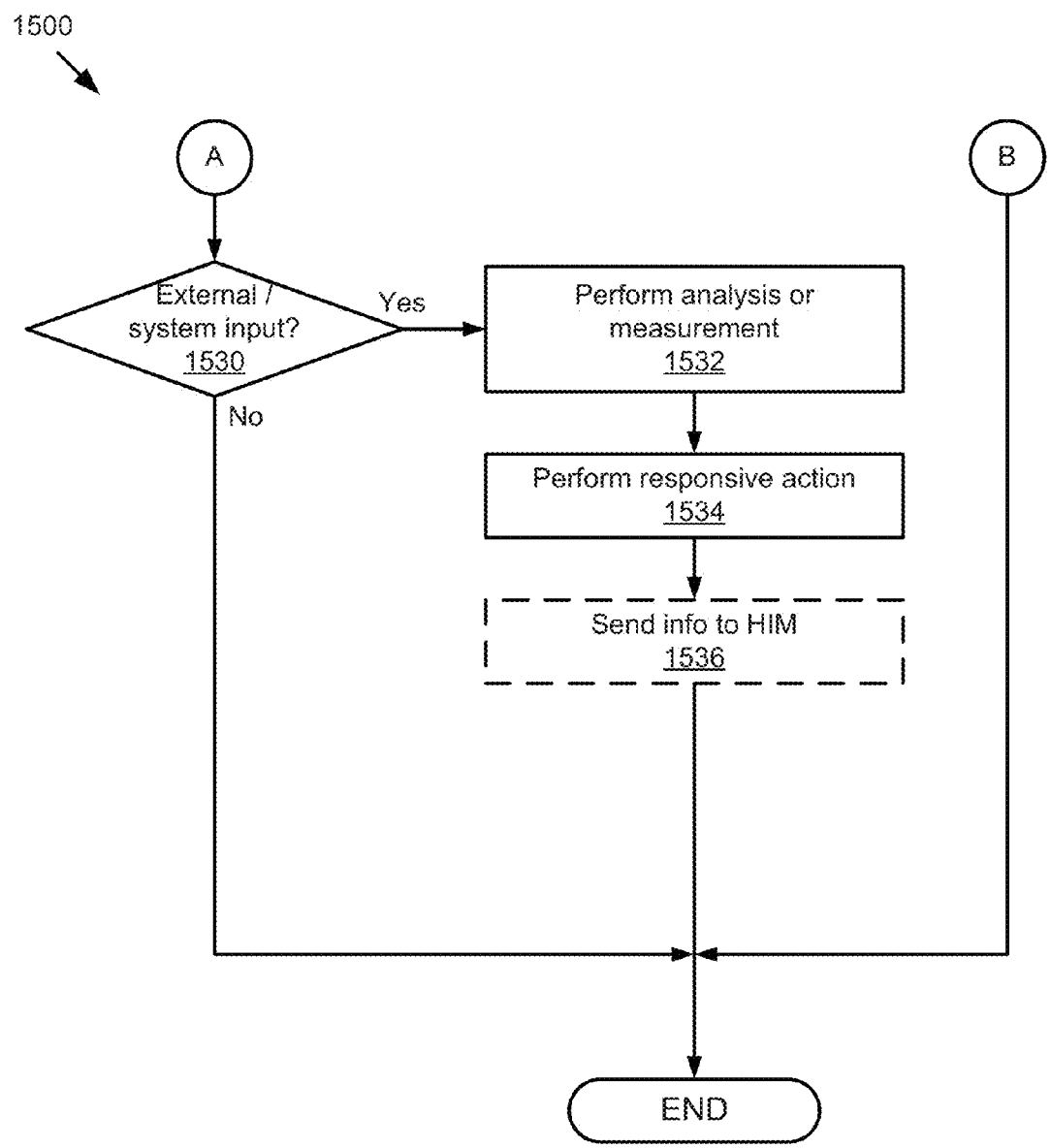

Referring now to FIGS. 15A and 15B, a method 1500 for processing captured information and retrieving a shared set of information for augmented interaction in financial services is described. It should be noted that the blocks of the method 1500 may be performed in various other orders different than that shown in FIG. 15 and described below.

The method 1500 begins by determining 1502 whether the processing of the captured information specifies that training on a new process should be performed. If not, the method 1500 continues to block 1510. On the other hand, if the teller or the supervisor is to be trained on a new process, the method 1500 proceeds to block 1504 and sends the training information for display by the first and second human interface modules 102a, 102b. In one embodiment, the shared set of information includes step-by-step instructions for performing a new process. Those step-by-step instructions are sent to the first and second human interface modules 102a, 102b and presented respectively to the first user and the second user. In another embodiment, the human interface modules 102 track the performance of the new process by the teller and present the step-by-step instructions on the display of the human interface module 102a at a time just before the user is about to perform the action and thus maximizing the value of the instructions by presenting them at a time and in the context they are most likely to be needed. In some embodiments, the first and second human interface module 102a, 102b are also used to record video or capture images of the user performing the new process. The captured information can be monitored 1506 for consistency with the training information and the proper way to perform the new process. The captured information can also be reviewed (e.g., by computer or software) to determine whether the new process is being performed within a first threshold of tolerance of an acceptable level. If not, a first notification is generated by the system 100 and sent 1508 to the first human interface module 102a. This allows the system 100 to provide immediate feedback to the teller to ensure that the teller performs a new process in accordance with the instructional material. Additionally, the captured information can also be reviewed to determine whether the new process is being performed outside of a second threshold of tolerance of an acceptable level. For example, the second threshold of tolerance may indicate that the teller is not performing the new process even close to the way outlined in the training information. If the new process is being performed outside the second threshold of tolerance, a second notification can be sent to the second human interface module 102b of the supervisor and presented to the supervisor so that the supervisor can intervene and correct the execution of the new process by the teller. It should be noted that blocks 1506 and 1508 are optional and therefore shown with dashed lines in FIG. 15A. Finally, it should be noted that the new process can be any number of processes performed by employees and service representatives of a financial institution. For example, the new process could be training of new employees for the current position. Another example is that the new process could be how to perform new procedures for financial reconciliation, new procedures associated with promotional offers, or even changes to existing procedures.

In block 1510, the method 1500 determines whether the processing requires information to be retrieved for the teller or the supervisor. If not, the method 1500 continues to block 1520. On the other hand, if the processing of the captured information specifies that information be retrieved for the teller or the supervisor, the method continues to block 1512. It should be noted that both the teller and the supervisor have been identified and authenticated as described above when they first began wearing the first and second human interface modules 102a, 102b. In some embodiments, the method 1500 may repeat the identification or authentication and processes here before sending private or confidential information to the human interface modules 102. In block 1512, the method 1500 determines a user level for the recipient of the information. Then the method retrieves 1514 information for the user level. For example, the teller may have a first level of access with limited access to certain information while the supervisor may have a second level of access with more access than that of the teller. It should be understood that there may be a different level of access provided to each user individually (e.g. and infinite number of levels with each user having their own level), or there may be a set (fixed number) of different levels with each level indicating what information may be accessed and each user assigned one of the different levels. Once the information has been retrieved, the information is sent 1516 to the human interface module 102 of the recipient. There, the information is overlaid upon the field of view of the user using the human interface module 102. Transmission and presentation of the information in this manner is particularly advantageous because only the recipient using the human interface module 102 is able to view the information. This is particularly advantageous because different information can be sent to different individuals such as a teller versus a supervisor, a bank employee versus an auditor or regulator, a manager versus an executive, an employee versus a compliance officer, etc.

In block 1520, the method 1500 determines whether the user has input a command via the human interface module 102. The user input may be a verbal command captured by the microphone, a gesture captured by the camera, or some other body movement detected by the human interface module 102. If not, the method 1500 continues to block 1530 of FIG. 15B. On the other hand, if the user input a command and it was detected by the system 100, the method 1500 continues to recognize 1522 the input, perform 1524 the requested action, and send 1526 information to the human interface module 102. In some instances, sending 1526 information to the human interface module 102 is optional, and thus block 1526 is depicted in FIG. 15A with dashes. In one example, a user may request a video conference with another bank employee, and the videoconference may be established and conducted with each party using its respective human interface module 102. In some embodiments, the videoconference may be encrypted and/or translated to the language with which each user is most comfortable. Since the human interface modules 102 include a camera and microphone, the input and output devices provided by each human interface module 102 may be used for both establishing a video conferences as well as conducting it. In another example, a user may input a command such as an emergency signal. For example it may be speaking the phrase "911," it may be a specific gesture or it may be selecting a particular button on the human interface module 102. The human interface module 102 may cooperate with the computing and communication module 104 and the backend server to initiate and conduct an emergency telephone call to a number such as 9-1-1. Moreover, the human interface module 102 may act as an event recorder to create a visual and audio record of what the user is experiencing because of the emergency situation. In yet another example, the user may preset a particular gesture or input to be the signaling of the silent alarm. Thus, the teller wearing the human interface module 102 can perform the preset gesture or input and thereby trigger a silent alarm. The human interface module 102 communicates the silent alarm to the computing and communication module 104 and the backend server 108. The backend server 108 can then send the silent alarm signal to the police as well as to other tellers, managers or supervisors in the branch to notify them about the silent alarm and that there may be an attempt to rob the financial institution. The above are merely some examples of user input and possible actions that can be performed collaboratively when there are a plurality of bank representatives wearing and utilizing respective human interface modules 102.

In block 1530 of FIG. 15B, the method 1500 determines whether the system 100 or an external system has generated an input. If not, the method 1500 is complete and ends. On the other hand, if the system 100 or an external system has sent an input, the method 1500 continues to perform 1532 analysis or measurement, perform 1534 a responsive action and send 1536 information to the human interface module 102. Again, in certain circumstances sending 1536 information to the human interface module 102 is optional, and therefore block 1536 is depicted in FIG. 15B with dashes. In one example embodiment, an emergency situation is detected and signaled to the human interface module 102, in response, the human interface module 102 activates a night vision mechanism to allow the user to view the bank branch during emergency situations such as power outages or robberies. The night vision mechanism may be similar to that described above with reference to FIG. 3. In another example embodiment, the human interface module 102 may include a light source (e.g. a flashlight) and a light sensor. An external system or the human interface module 102 via the light sensor may measure the light level, and if the measured light level is below threshold, the light source on the human interface module 102 is activated. In yet another example embodiment, external systems or the human interface module 102 may scan the scene for the authenticity documents. The images captured by the human interface module 102 may be analyzed or other bank surveillance systems may be analyzing documents passed to the teller. The system 100 may detect when a document or item is authentic, and if the document is not authentic, a notification may be sent to the human interface module of the teller. This is a similar process as has been described above with reference to counterfeiting detection and countermeasures. After the human interface module 102 performs 1534 the responsive action or sends 1536 information to the human interface module 102, the method 1500 is complete and ends.

A mobile information gateway and methods of use have been described above. In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present invention is described in one embodiment below primarily with reference to user interfaces and particular hardware. However, the present invention applies to any type of computing system that can receive data and commands, and present information as part of a mobile device.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the present embodiment of invention has been presented for the purposes of illustration and description. It is not intended to be exhaustive or to limit the present embodiment of invention to the precise form disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or formats. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the specification of the present embodiment of invention is intended to be illustrative, but not limiting, of the scope of the present embodiment of invention, which is set forth in the following claims.

What is claimed is:

1. A method for augmented interaction for customer interaction between a first user and a second user, the method comprising:

capturing information with a first human interface module;

processing the information captured by the first human interface module to determine a new process on which to train the first user;

retrieving a set of shared information for training the first user in performing the new process based upon the processing of the information captured by the first human interface module;

presenting the shared set of information overlaid upon a field of view of the first user using the first human interface module for the first user to perform the new process according to the training;

presenting the shared set of information overlaid upon a field of view of the second user using a second human interface module for the second user to supervise the first user performing the new process according to the training;

processing the information captured by the first human interface module to determine an identity of the first user;

processing the information captured by the first human interface module to authenticate the first user;

processing the identity of the first user to determine a first level of access and retrieve information for the first level of access; and presenting the information for the first level of access overlaid upon the field of view of the first user using the first human interface module.

2. The method of claim 1 wherein the shared set of information includes step-by-step instructions for performing the new process.

3. The method of claim 1 wherein:
the shared set of information relates to the new process;
the capturing information with the first human interface module includes recording the first user performing an action of the new process; and
the method further comprises:
processing the captured information for consistency with the new process; and
generating a first notification and sending the first notification to the first human interface module if the information captured by the first human interface module is inconsistent with the new process beyond a first tolerance level.

4. The method of claim 3 further comprising generating a second notification and sending the second notification to the second human interface module if the information captured by the first human interface module is inconsistent with the new process beyond a second tolerance level.

5. The method of claim 1 further comprising:
capturing information with the second human interface module;
processing the information captured by the second human interface module to determine an identity of the second user;
processing the information captured by the second human interface module to authenticate the second user;
processing the identity of the second user to determine a second level of access and retrieve information for the second level of access; and
presenting the information for the second level of access overlaid upon the field of view of the second user using the second human interface module.

6. The method of claim 5 wherein the second level of access includes greater access rights than the first level of access and wherein presenting the information for the second level of access also includes presenting the information for the first level of access.

7. The method of claim 1 wherein the first human interface module and the second human interface module each include a camera and a microphone, and the method comprises establishing a video conference call between the first human interface module and the second human interface module.

8. The method of claim 1 comprising:
receiving input from the first user via the first human interface module;
recognizing the received input as an emergency signal; and
initiating a call to an emergency telephone number.

9. The method of claim 8 wherein the input is one from the group of a gesture, a voice command, and a body movement of the first user detectable by the human interface module.

10. The method of claim 1 comprising:
receiving input from the first user via the first human interface module;
recognizing the received input as signaling of a silent alarm; and
sending a silent alarm signal to the second human interface module.

11. The method of claim 1 comprising:
detecting an emergency situation with the first human interface module; and
activating a night vision mechanism of the first human interface module.

12. The method of claim 1 comprising:
measuring using the first human interface module a light level; and
activating a light source on the first human interface module if the measured light level is below a threshold.

13. The method of claim 1 comprising:
analyzing the information captured with the first human interface module for authenticity;
detecting whether an item is authentic; and
sending a notification if the item is detected as not authentic.

14. The method of claim 13 wherein the notification is sent to the first human interface module and the second interface module, and the method comprises recording the notification at a backend service server.

15. A system for augmented interaction for customer interaction comprising:
a processor, and;
a memory storing instructions that, when executed, cause the system to:
capture information with a first human interface module;
process the information captured by the first human interface module to determine a new process on which to train the first user;
retrieve a set of shared information for training the first user in performing the new process based upon the processing of the information captured by the first human interface module;
present the shared set of information overlaid upon a field of view of the first user using the first human interface module for the first user to perform the new process according to the training;
present the shared set of information overlaid upon a field of view of a second user using the second human interface module for the second user to supervise the first user performing the new process according to the training;
process the information captured by the first human interface module to determine an identity of the first user;
process the information captured by the first human interface module to authenticate the first user;
process the identity of the first user to determine a first level of access and retrieve information for the first level of access; and
present the information for the first level of access overlaid upon the field of view of the first user using the first human interface module.

16. The system of claim 15 wherein the information captured with the first human interface module includes a recording of the first user performing an action of the new process; and the memory also stores instructions that, when executed, cause the system to:
process the captured information for consistency with the new process; and
generate a first notification and sending the first notification to the first human interface module if the information captured by the first human interface module is inconsistent with the new process beyond a first tolerance level.

17. The system of claim 15 wherein the memory also stores instructions that, when executed, cause the system to:
receive input from the first user via the first human interface module;
recognize the received input as signaling of a silent alarm; and
send a silent alarm signal to the second human interface module.

18. The system of claim 15 wherein the memory also stores instructions that, when executed, cause the system to:
analyze the information captured with the first human interface module for authenticity;
detect whether an item is authentic; and
send a notification if the item is detected as not authentic.

* * * * *